United States Patent
Kandula et al.

(10) Patent No.: US 11,505,919 B2
(45) Date of Patent: Nov. 22, 2022

(54) METHOD FOR REMOTE OPERATION OF MACHINES USING A MOBILE DEVICE

(71) Applicant: Caterpillar Inc., Peoria, IL (US)

(72) Inventors: Suneel Venkata Kandula, Hyderabad (IN); Justin Peters, Clayton, NC (US)

(73) Assignee: Caterpillar Inc., Peoria, IL (US)

( * ) Notice: Subject to any disclaimer, the term of this patent is extended or adjusted under 35 U.S.C. 154(b) by 211 days.

(21) Appl. No.: 16/939,201

(22) Filed: Jul. 27, 2020

(65) Prior Publication Data

US 2022/0025611 A1 Jan. 27, 2022

(51) Int. Cl.
| | | |
|---|---|---|
| *E02F 9/20* | (2006.01) | |
| *G05D 1/00* | (2006.01) | |
| *G06F 3/01* | (2006.01) | |
| *H04W 4/40* | (2018.01) | |

(52) U.S. Cl.
CPC ............ *E02F 9/205* (2013.01); *E02F 9/2045* (2013.01); *G05D 1/0016* (2013.01); *G05D 1/0022* (2013.01); *G06F 3/016* (2013.01); *H04W 4/40* (2018.02); *G05D 2201/0202* (2013.01)

(58) Field of Classification Search
CPC ....... E02F 9/205; E02F 9/2045; E02F 9/2054; E02F 9/265; G05D 1/0016; G05D 1/0022; G05D 2201/0202; G05D 1/0027; G06F 3/016; H04W 4/40
USPC .......................................................... 701/50
See application file for complete search history.

(56) References Cited

U.S. PATENT DOCUMENTS

| | | | |
|---|---|---|---|
| 6,847,892 B2 | 1/2005 | Zhou et al. | |
| 8,340,873 B2* | 12/2012 | Finley | E02F 9/265 |
| | | | 701/50 |
| 10,075,576 B1* | 9/2018 | Rule | H04W 12/08 |
| 10,166,948 B2 | 1/2019 | Kang et al. | |
| 10,209,739 B2* | 2/2019 | Nessel | B60K 37/06 |
| 10,370,827 B2* | 8/2019 | Koga | E02F 9/2054 |
| 10,474,228 B2* | 11/2019 | Niccolini | H04N 7/18 |
| 2005/0083196 A1* | 4/2005 | Furem | E02F 9/205 |
| | | | 340/870.01 |
| 2013/0013525 A1* | 1/2013 | Dlott | G06Q 10/063 |
| | | | 705/317 |

(Continued)

FOREIGN PATENT DOCUMENTS

| | | | |
|---|---|---|---|
| CN | 102904968 | * | 1/2013 |
| CN | 206452555 U | | 8/2017 |

(Continued)

*Primary Examiner* — Muhammad Shafi

(57) ABSTRACT

A method for remote operation of machines using a mobile device is disclosed. The mobile device may detect and display one or more machines. The mobile device may establish a wireless connection with a machine. The mobile device may retrieve and display machine related information including one or more machine parameters, one or more implements, and one or more controls of the machine. In addition, the mobile device may transmit input commands received from an operator via the controls to the machine. The machine may be configured to establish the wireless connection with the mobile device and broadcast machine related information to the mobile device. The machine may also execute the input commands received from the mobile device and perform one or more functions. The method includes steps performed by the mobile device and the machine for the remote operation respectively.

20 Claims, 20 Drawing Sheets

(56) References Cited

U.S. PATENT DOCUMENTS

| | | | |
|---|---|---|---|
| 2015/0052591 A1* | 2/2015 | Miura | A01B 79/005 726/4 |
| 2015/0168951 A1 | 6/2015 | Ganesan et al. | |
| 2016/0076226 A1* | 3/2016 | Edara | G07C 5/0841 701/25 |
| 2016/0183447 A1* | 6/2016 | Buhler | G06Q 50/02 701/50 |
| 2016/0183459 A1* | 6/2016 | Buhler | G06F 16/29 701/50 |
| 2016/0189445 A1* | 6/2016 | Schmidt | G07C 5/008 701/50 |
| 2016/0194014 A1 | 7/2016 | Rajendran | |
| 2017/0016211 A1* | 1/2017 | Arimatsu | G01S 19/14 |
| 2017/0088099 A1 | 3/2017 | Ma et al. | |
| 2019/0032305 A1* | 1/2019 | Hageman | E02F 3/847 |
| 2019/0127952 A1 | 5/2019 | Pfaff et al. | |
| 2019/0166760 A1* | 6/2019 | Palla | H04L 67/00 |
| 2019/0196462 A1 | 6/2019 | Bolz et al. | |
| 2019/0253641 A1* | 8/2019 | Matsuda | G01C 3/06 |
| 2019/0284027 A1* | 9/2019 | Albrecht | B66C 13/46 |
| 2020/0226854 A1* | 7/2020 | Kugler | G06F 21/30 |
| 2021/0029872 A1* | 2/2021 | Brandt | A01D 75/28 |
| 2021/0061622 A1* | 3/2021 | Hayashi | B66C 23/905 |
| 2021/0221664 A1* | 7/2021 | Okamoto | G05D 1/0022 |
| 2022/0042278 A1* | 2/2022 | Currier | G05D 1/0289 |

FOREIGN PATENT DOCUMENTS

| | | |
|---|---|---|
| CN | 206848770 U | 1/2018 |
| CN | 105607467 B | 2/2018 |
| CN | 107813787 A | 3/2018 |
| DE | 20221564 U1 * | 6/2006 |
| EP | 2508680 | 10/2012 |
| KR | 2016106440 A | 9/2016 |
| WO | 0113187 | 2/2001 |

* cited by examiner

METHOD FOR REMOTE OPERATION OF MACHINES USING A MOBILE DEVICE

TECHNICAL FIELD

The present disclosure relates in general to remote control of machines. More particularly, the present disclosure relates to a method for remote operation of different types of machines in a line of sight of an operator using a mobile device.

BACKGROUND

In industrial work environments, such as construction sites and underground mining sites, different utility machines are employed to carry out a variety of tasks, such as load carrying, unloading, and ferrying of goods to different locations within the work environments. During operation, the different utility machines may need to be continuously monitored, controlled, and/or coordinated to perform the variety of tasks as desired and in a safe manner. At present, different machine control systems and/or devices are made available to a machine operator such that the machine operator can communicate with and operate the utility machines remotely. Typically, the utility machines are within a line of sight of the machine operator so that the machine operator may visually inspect the utility machines during operation. However, the machine operator may find the existing machine control systems to be cumbersome and/or complex to understand and/or use. The machine operator may also find it difficult to operate the different utility machines using a limited set of controllable actions provided in the existing machine control systems. In some instances, the existing machine control systems may not be adapted to and/or suitable for enabling various actions to be performed by the different utility machines. For example, a machine control system adapted to manipulate a loader crane may not be adapted to manipulate a ferrying truck or a tractor. Consequently, the machine operator may need multiple machine control systems to operate the different utility machines respectively which may not be desirable and may lead to confusion. Further, the machine operator may also require additional training and/or support to use the existing machine control systems correctly.

US Patent Publication No. 20190284027 relates to a remote-control device for a crane, a construction machine, and/or an industrial truck. The remote-control device comprises a mobile device in the form of a tablet computer having a screen with touch-screen function. The remote-control device also includes an input means for inputting control commands via touch-screen display means. The remote-control device also includes a signal transmission device for transmitting the input control commands to control apparatus of the crane, the construction machine, and/or the industrial truck. In addition, the remote-control device presents camera aided images and/or virtual images of the working environment of a machine such that a machine operator can monitor the work environment.

However, in some instances, visual aids, such as the camera aided images and/or the virtual images of the work environment or a work tool of the machine may not be sufficient to assess different critical parameters related to the machine. Examples of the critical parameters include, but not limited to, engine on/off status, power brake active/inactive status, and machine door open/close status. Also, in some instances, the remote-control device may not be configured to detect, display, and/or visually represent additional tools, accessories, retrofitted tools, and/or modifications to existing tools in the machine. Further, implementing safety protocols in situations when the remote-control device, the touch-screen function, and/or the visual aids are faulty or inoperable may be necessary. In addition, safety of the machine operator during operation of the machine may also need to be accounted for in scenarios when the machine operator is in a vicinity of the machine.

Hence, there is a need for a method and a system for remote operation of the different utility machines in the line of sight of the machine operator in a safe manner.

SUMMARY OF THE INVENTION

In an aspect of the disclosure, a method for remote operation of machines using a mobile device is disclosed. The method includes a step of detecting one or more machines using a mobile device and establishing a wireless connection with a machine. The method also includes a step retrieving machine related information from the machine upon the establishment of the wireless connection. The machine related information may include one or more machine parameters, one or more implements of the machine, and one or more controls of the machine. The method also includes a step of displaying the machine parameters, the implements, and the controls respectively on a graphical user interface (GUI) of the mobile device. Further, the method includes a step of receiving input commands from an operator. In addition, the method also includes a step of broadcasting the input commands to the machine. The input commands may include computer instructions to be executed by the machine in order to perform one or more functions corresponding to the controls.

In another aspect of the present disclosure, a mobile device for remote operation of machines is disclosed. The mobile device includes a communication interface that is capable of transmitting and receiving a wireless signal. The mobile device includes a memory to store or more computer instructions. Further, the mobile device includes a processor to execute the computer instructions stored in the memory. The processor includes a machine detection module to detect and display the machines on a graphical user interface (GUI) of the mobile device via a wireless network. The processor also includes a connection module that facilitates an operator to establish a wireless connection with a machine of the machines displayed. The processor also includes a machine control module to retrieve machine related information from the machine upon the establishment of the wireless connection. The machine related information may include one or more machine parameters, one or more implements, and one or more controls of the machine. Further the processor may include an implement module to display the machine related information on the GUI. In addition, the processor may include a command module to receive input commands from an operator. The command module may then transmit the input commands to the machine. The input commands may include computer instructions to be executed by the machine in order to perform one or more functions corresponding to the controls.

In yet another aspect of the disclosure, a machine configured for remote operation via mobile devices is disclosed. The machine includes a communication interface that is capable of transmitting and receiving a wireless signal. The machine may also include one or more implements capable of performing one or more functions respectively. Further, the machine may include a remote controller to execute one or more computer instructions. The remote controller may include a memory to store the computer instructions. The remote controller may also include a connection module to validate the mobile devices requesting a wireless connection with the machine. The connection module may then establish the wireless connection with the mobile devices upon validation. The remote controller may also include a broadcast module to broadcast machine related information via the communication interface to the mobile devices. The machine related information may include one or more machine parameters, one or more implements of the machine, and one or more controls of the machine. Further, the remote controller may include an execution module to execute input commands received from the mobile devices. The input commands may include the computer instructions to be executed by the remote controller in order to perform one or more functions of the machine and/or the one or more functions of the implements.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
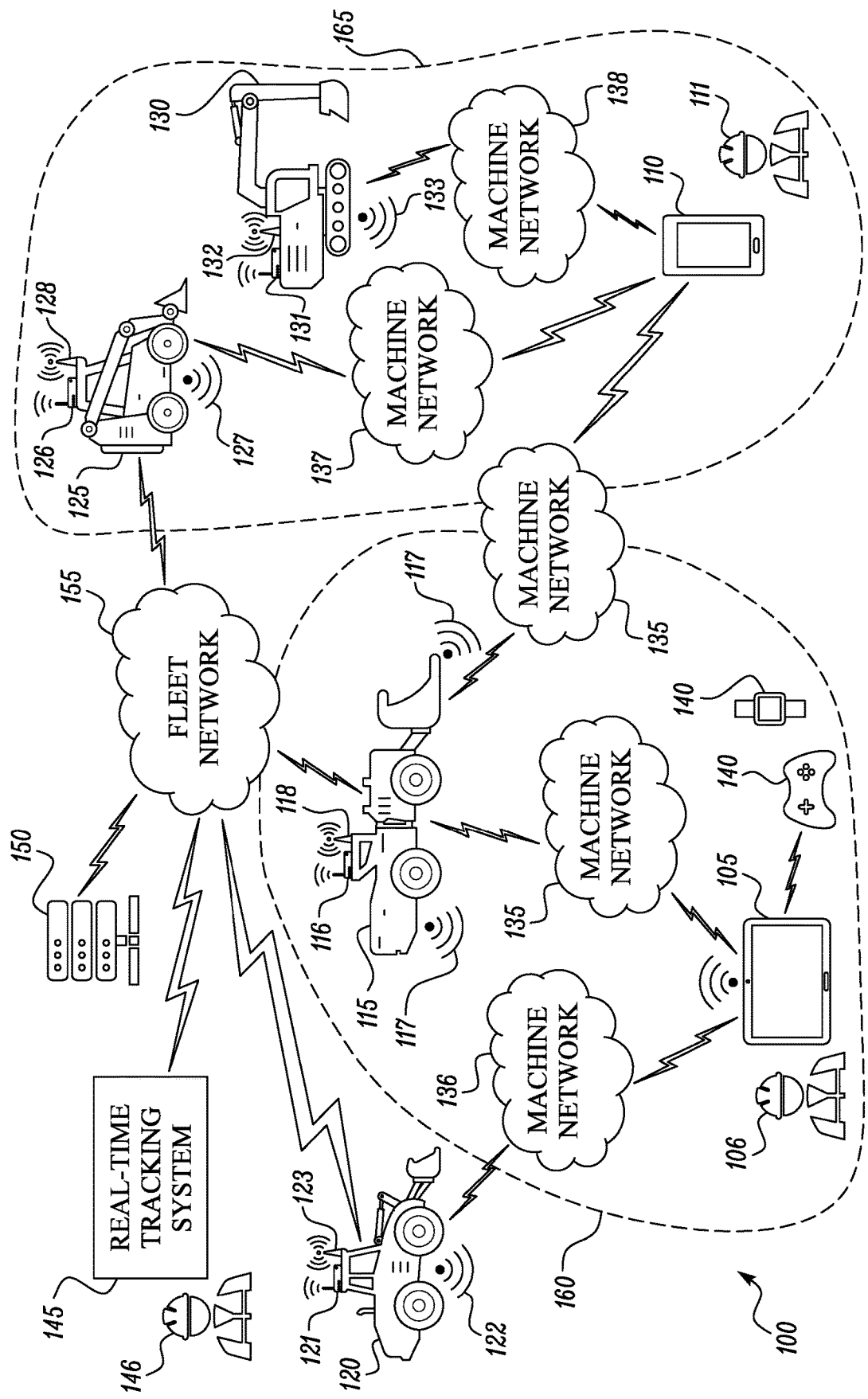
FIG. 1 is a schematic illustration of an environment in accordance with which various embodiments of the present disclosure may be implemented.

Referring to FIG. 1, a schematic illustration of an environment 100 is disclosed. Examples of the environment 100 include, but are not limited to, a quarry, a construction site, and/or a warehouse. The environment 100 includes mobile devices 105, 110 capable of having a wireless communication with machines 115, 120, 125, 130 via corresponding machine networks 135, 136, 137, 138 respectively. The mobiles devices 105, 110 may include a first mobile device 105 operated by a first operator 106 and a second mobile device 110 operated by a second operator 111. Examples of the mobile devices 105, 110 include, but are not limited to, mobile phones, portable computers, laptops, mobile devices, handheld devices, wearable devices, personal digital assistants (PDAs), tablet personal computers, digital notebook, and similar electronic devices. The machine networks 135, 136, 137, 138 may include communication networks such as, but not limited to, a Local Area Network (LAN), a Wireless Local Area Network (WLAN), a Small Area Network (SAN), and a Wi-Fi Direct Network. The machines 115, 120, 125, 130 may include wireless access points (WAP) 116, 121, 126, and 131 respectively that create the corresponding machine networks 135, 136, 137, 138 respectively, necessary for wireless communication with the mobile devices 105, 110. The WAP 116, 121, 126, 131 may correspond to hardware components provided in the machines 115, 120, 125, and 130 respectively. The machine networks 135, 136, 137, 138 created may broadcast corresponding wireless signals 117, 122, 127, 133 originating from the machines 115, 120, 125, 130 respectively. Examples of the machines 115, 120, 125, 130 include, but are not limited to, Load Haul Dump (LHD) Trucks, Small Wheel Loaders (SWL), Skid Steer Loaders (SSL), loaders, Hydraulic Excavators (HEX), and tractors. The machines 115, 120, 125, 130 may include one or more implements respectively to perform one or more tasks. The machines 115, 120, 125, 130 may also include one or more accessories such as, for example, lights, horn, and indicators respectively. In some embodiments, the machines 115, 120, 125, 130 may also include additional retrofitted tools, modifications, and/or enhancements to the implements.

The mobile devices 105, 110 may be able to detect a range or a proximity of the machines 115, 120, 125, 130 with respect to the mobile devices 105, 110 respectively via the wireless signals 117, 122, 127, 133. Further, the mobile devices 105, 110 may be able to establish a wireless connection such as, for example, a Wi-Fi direct connection, with the machines 115, 120, 125, 130 respectively via the machine networks 135, 136, 137, 138 respectively. For example, the first mobile device 105 may be able to detect the wireless signals 117, 122, 127, 133 originating from a first machine 115, a second machine 120, a third machine 125, and/or a fourth machine 130 respectively. The first mobile device 105 may then be able to establish the wireless connection with the first machine 115, the second machine 120, the third machine 125, and/or a fourth machine 130 depending on a strength of the wireless signals 117, 122, 127, 133. The strength of the wireless signals 117, 122, 127, 133 may correspond to the range or the proximity of the machines 115, 120, 125, 130 with respect to the first mobile device 105. For example, the strength of the wireless signal 117 originating from the first machine 115 may be detected as a "strong" signal in the first mobile device 105 for instances when the first machine 115 may be closer in proximity to the first mobile device 105 than the machines 120, 125, 130. In an embodiment, the "strong" signal may also indicate that the first machine 115 is within a line-of-sight of the first operator 106 of the first machine 115. Further, the strength of the wireless signal 122 originating from the second machine 120 may then be detected as a "moderate" signal in the first mobile device 105 for instances when the second machine 120 is closer in proximity to the first mobile device 105 than the machines 125, 130 but farther in proximity than the first machine 115. Furthermore, the strength of the wireless signal 127 originating from the third machine 125 may then be detected as a "weak" signal in the first mobile device 105 for instances when the third machine 125 is farther in proximity to the first mobile device 105 than machines 115, 120, 130 respectively. On the contrary, the strength of the wireless signals 127, 133 originating from the machines 125, 130 respectively may then be detected as a "strong" signal in the second mobile device 110 for instances when the machines 125, 130 are closer in proximity to the second mobile device 110 than the machines 115, 120 respectively. The second mobile device 110 may be then be able to establish the wireless connection with the machines 125, 130 via the machine networks 137, 138 respectively. The strength of the signals 117, 122, 127, 133 may also determine a strength of the wireless connection established between the mobile devices 105, 110 and the machines 115, 120, 125, 130 respectively. The strength of the wireless connection may determine a responsiveness of the machines 115, 120, 125, 130 corresponding to the wireless communication received from the mobile devices 105, 110. For example, the first mobile device 105 may detect the "weak" signal corresponding to the third machine 125 and may be unable to establish the wireless connection or may establish a "weak" connection with the third machine 125.

In one embodiment, both the mobile devices 105, 110 may be able to establish the wireless connection with a same machine, for example, the first machine 115 simultaneously. In another embodiment, a single mobile device, for example, the first mobile device 105 may be able to establish the wireless connection with a single machine, for example, the first machine 115 at a given point in time. In yet another embodiment, the single mobile device, for example, the first mobile device 105 may be able to establish the wireless connection with the machines 115, 120, 125, 130 simultaneously. The establishment of wireless connection between the mobile devices 105, 110 and the machines 115, 120, 125, 130 is herein referred to as "pairing". For example, the first mobile device 105 may be paired with the first machine 115. In some embodiments, the operators 106 and 111 of the mobile devices 105, 110 respectively may be required to input authentication details, for example, a Personal-Identification-Number (PIN) or a pre-set password in order to pair the mobile devices 105, 110 with the machines 115, 120, 125, 130 individually.

Upon pairing, the operators 106 and 111 may be able to reserve the machines 115, 120, 125, 130 for remote operation via the mobile devices 105, 110 respectively. In an embodiment, the operators 106 and 111 may be able to reserve only one of the machines 115, 120, 125, 130 respectively at a given point in time. In another embodiment, the operators 106 and 111 may be able to reserve the machines 115, 120, 125, 130 simultaneously corresponding to the first mobile device 105 and the second mobile device 110 respectively. For example, the first operator 106 may reserve only the first machine 115 at a given point in time and/or the other machines 120, 125, 130 simultaneously. Further, the first machine 115 may be able to be reserved by only one of the mobile devices, for example, the first mobile device 105 at a given point in time.

The operators 106 and 111 may be able to send commands to the machines 115, 120, 125, 130 via the mobile devices 105, 110 respectively. For example, the first mobile device 105 paired with the first machine 115 may be able to send commands to the first machine 115. The commands may correspond to computer instructions configured to control and manipulate the different implements, the accessories, and/or movement of the machines 115, 120, 125, 130 respectively. In an embodiment, a standalone mobile application may be provided in the mobile devices 105, 110 to enable the operators 106 and 111 to send commands to the machines 115, 120, 125, 130. The standalone application may be configured to detect, pair with, and control the machines 115, 120, 125, 130 wirelessly. The standalone application may have a graphical user interface (GUI) 401 (see FIG. 4) configured to display visual or graphical representations of the machines 115, 120, 125, 130. The standalone application may also display the different implements, the accessories, and/or the movement of the machines 115, 120, 125, 130 via the GUI 401 in order to assist the operators 106 and 111. Examples of the visual or graphical representations include, but are not limited to, text, icons, symbols, images, animations, video and/or live video. In some embodiments, the mobile devices 105, 110 may also be paired with a peripheral input device 140 in order to facilitate the operators 106, 111 to control the machines 115, 120, 125, 130 respectively. The peripheral input device 140 may be paired with the mobile devices 105, 110 via Bluetooth, Wi-Fi, Wi-Fi direct, or as a hardware connection such a USB peripheral to the mobile devices 105, 110. Examples of the peripheral input device 140 may include, but are not limited to, a joystick, a gamepad, a keyboard, a mouse, a gesture-controlled device, an audio-controlled device, or a wearable device such as, for example, a smart watch.

The environment 100 may also include a real-time tracking system 145 and a server 150 that may be in wireless communication with respect to each other and the machines 115, 120, 125, 130 via a fleet network 155. Examples of the server 150 include, but are not limited to, computers, laptops, mobile devices, handheld devices, personal digital assistants (PDAs), tablet personal computers, digital notebook, and similar electronic devices. Examples of the fleet network 155 include, but are not limited to, a Wide Area Network (WAN), interne, a Wireless ad hoc network (WANET), and a Mobile ad hoc network (MANET). An operator 146 of the real-time tracking system 145 may control the movement of the machines 115, 120, 125, 130 in the environment 100 via the server 150. The server 150 may facilitate autonomous movement of the machines 115, 120, 125, 130 in the environment 100 via the fleet network 155. The server 150 may employ location and movement tracking algorithms for the autonomous movement of the machines 115, 120, 125, 130 in the environment 100. The server 150 may also send and/or receive real-time location information of the machines 115, 120, 125, 130 via the fleet network 155 respectively. The real-time tracking system 145 may also receive the real-time location information of the machines 115, 120, 125, 130 via the server 150. The machines 115, 120, 125, 130 may have on-board Wi-Fi radio-antennas 118, 123, 128, 132 to connect to the fleet network 155 respectively and communicate with the server 150 and/or receive instructions from the server 150. The machines 115, 120, 125, 130 may also be able to send and/or receive the real-time location information to the server 150 respectively.

In an exemplary example, the first operator 106 may detect the machines 115, 120, 125, 130 via machine networks 135, 136, 137, 138 respectively. The first operator 106 may pair the first mobile device 105 with the first machine 115 in the loading zone 160 via the machine network 135. The first operator 106 may then send instructions or commands wirelessly to the first machine 115 via the standalone mobile application in the first mobile device 105 to perform one or more tasks. Upon the completion of the tasks, the first operator 106 may direct the first machine 115 to go to the dumping zone 165. The first machine 115 may then unpair or disconnect from the first mobile device 105 and establish connection with the server 150 in order to reach the dumping zone 165. The first machine 115 may also send real-time location information of the first machine 115 to the server 150. The server 150 may broadcast the target and the real-time direction information to the first machine 115 in order to assist the first machine 115 in reaching the dumping zone 165. Similarly, upon arrival in the dumping zone 165, the second operator 111 may pair the second mobile device 110 with the first machine 115 via the machine network 135. The second operator 111 may then perform tasks using the first machine 115 remotely and send commands to the first machine 115 to return to the loading zone 160. During a time interval between the first machine 115 moving from the loading zone 160 to the dumping zone 165 and returning to the loading zone 160, the first operator 106 may also pair the first mobile device 105 with the second machine 120 via the machine network 136 and perform the tasks using the second machine 120 remotely.

In another exemplary example, the operator 146 of the real-time tracking system 145 may send instructions to the server 150 via the fleet network 155 to direct the second machine 120 to a loading zone 160 in the environment 100, for example, the underground mine site. The server 150 may broadcast target and real-time direction information to the second machine 120 in order to assist the second machine 120 to arrive at the loading zone 160 autonomously. The first operator 106 may then pair the first mobile device 105 with the second machine 120 via the machine network 136 in order to assume control of the second machine 120 and perform the tasks using the second machine 120. Upon completion of the tasks, the first operator 106 may unpair or disconnect the wireless connection with the second machine 120. The server 150 may detect the disconnection of the second machine 120 with the first mobile device 105 and update a location of the second machine 120 in the loading zone 160. The real-time tracking system 145 may then send instructions to the server 150 via the fleet network 155 to direct the second machine 120 from the loading zone 160 to a dumping zone 165.

It may be apparent that alternate embodiments of network communication between the mobile devices 105, 110 and the machines 115, 120, 125, 130. For example, in one embodiment, the mobile devices 105, 110 may establish the wireless connection with the machines 115, 120, 125, 130 via a single machine network (not shown) in place of the machine networks 135, 136, 137, 138. Examples of the single machine network include, but are not limited to, a Local Area Network (LAN), a Wireless Local Area Network (WLAN), and a Small Area Network (SAN). In another embodiment, the mobile devices 105, 110 may also establish the wireless connection with the machines 115, 120, 125, 130 via the fleet network 155 in place of the machine networks 135, 136, 137, 138.

Figure 2:
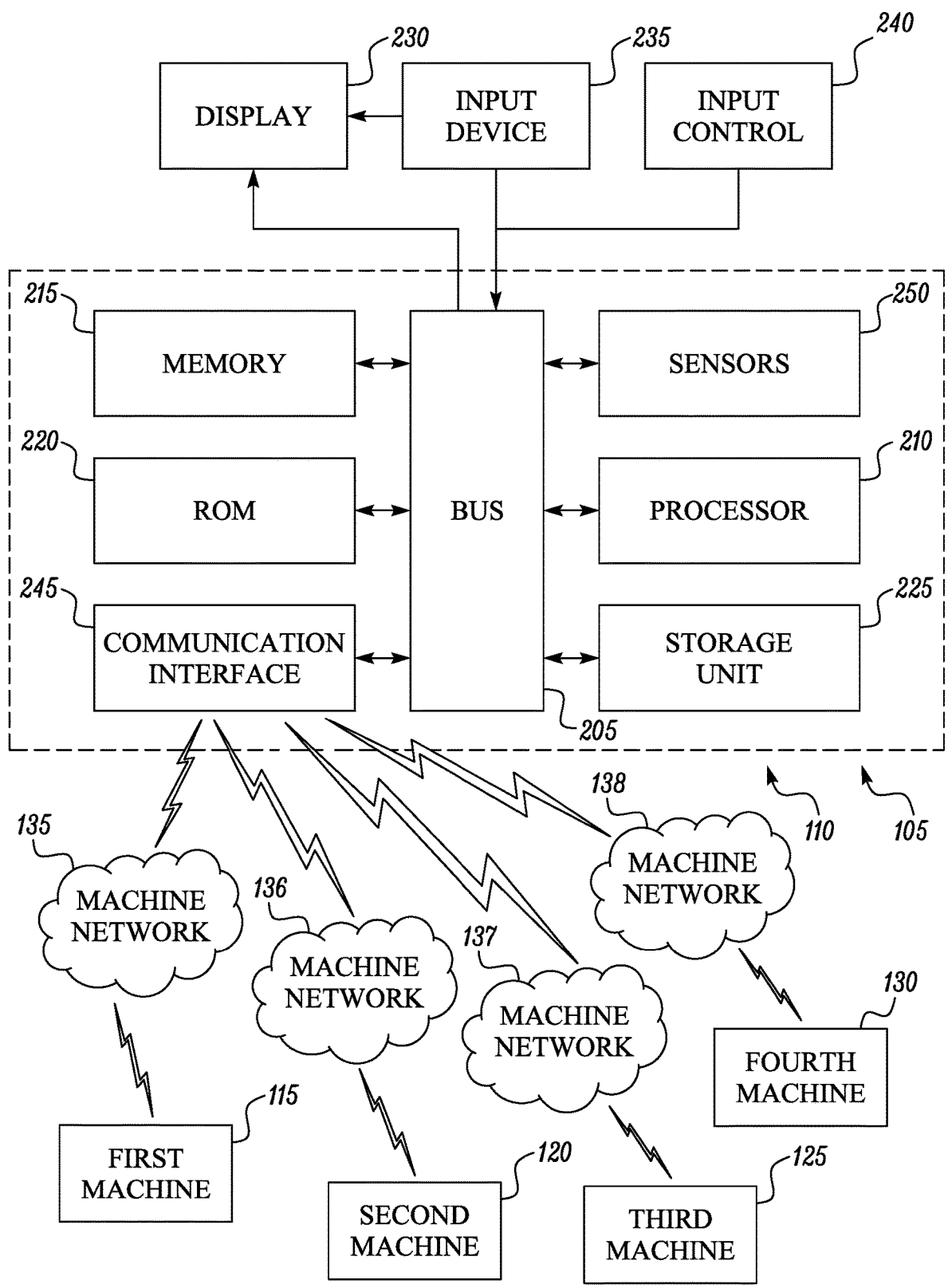
FIG. 2 is a schematic block diagram of a mobile device, in accordance with an embodiment of the present disclosure.

Referring to FIG. 2, a block diagram of the mobile devices 105, 110 of FIG. 1 is disclosed. For purposes of clarity and understanding the first mobile device 105 of FIG. 1 will be described herein in detail. Detailed descriptions related to the second mobile device 110 will be omitted for brevity.

The first mobile device 105 includes a bus 205 or other communication mechanism for communicating information, and a processor 210 coupled with the bus 205 for processing information. The mobile devices 105, 110 also include a memory 215, such as a random-access memory (RAM) or other dynamic storage device, coupled to the bus 205 for storing information and instructions to be executed by the processor 210. The memory 215 can be used for storing temporary variables or other intermediate information during execution of instructions to be executed by the processor 210. The first mobile device 105 further includes a read only memory (ROM) 220 or other static storage device coupled to bus 205 for storing static information and instructions for the processor 210. A storage unit 225, such as a magnetic disk or optical disk, is provided and coupled to the bus 205. The storage unit 225 may store a stand-alone mobile application that facilitates remote control of machines 115, 120, 125, 130. The stand-alone mobile application may correspond to a computer program or a software application configured to be executed on the first mobile device 105. The stand-alone mobile application may be downloaded from application distribution platforms and stored in the storage unit 225 via the internet. The stand-alone mobile application may also be installed in the first mobile device 105 directly via USB communication. In an embodiment, the stand-alone application may include predefined machine related information corresponding to one or more predefined machines that may be stored in the storage unit 225. The predefined machine related information may include one or more predefined accessories, one or more predefined implements, and one or more predefined controls of the predefined machines respectively. The standalone application may also include text, icons, symbols, images, animations, and video corresponding to the predefined machines, the machine parameters, the implements, the accessories, and the controls respectively that may be stored in the storage unit 225. In some embodiments, the text, the icons, the symbols, the images, the animations, the video, and/or a live video stream may also be retrieved from the machines 115, 120, 125, 130 via the machine networks 135-138 respectively. The text, the icons, the symbols, the images, the animations, the video, and/or a live video stream retrieved may be temporarily stored in the storage unit 225 and/or the memory 215. Information stored in the storage unit 225 may also be temporarily accessed by the processor 210 via the memory 215.

The first mobile device 105 can be coupled via the bus 205 to a display 230, such as a light emitting diode (LED) and a liquid crystal display (LCD) for displaying information to an operator, for example, the operators 106, 111 (see FIG. 1). An input device 235 is coupled to bus 205 for communicating information and command selections to the processor 210. The input device 235 may be included in the display 230, for example a touch screen that facilitates detection of multi-touch inputs from the user via the display 230. The input device 235 may also correspond to peripheral input devices such as, for example, the peripheral input device 140 of FIG. 1 that may be paired with the first mobile device 105 via Bluetooth, Wi-Fi, Wi-Fi direct, or as a hardware connection such a USB peripheral to the mobile devices 105, 110. Examples of the peripheral input device 140 include, but are not limited to, a joystick, a gamepad, a keyboard, a mouse, a gesture-controlled device, or a wearable device such as, for example, a smart watch. In some embodiments, the input device 235 may also correspond to a microphone (not shown) provided in the first mobile device 105 that is configured to received audio inputs or instructions from the operators 106, 111. In some embodiments, the input device 235 may also include alphanumeric and other keys. Another type of user input device is an input control 240, such as a mouse, a trackball, or cursor direction keys for communicating direction information and command selections to the processor 210 and for controlling cursor movement on the display 230.

Various embodiments are related to the use of first mobile device 105 for implementing the techniques described herein. In one embodiment, the techniques are performed by the first mobile device 105 in response to the processor 210 executing instructions included in the memory 215. Such instructions can be read into the memory 215 from another machine-readable medium, such as the storage unit 225 including the standalone application. Execution of the instructions included in the memory 215 causes the processor 210 to perform the process steps described herein.

The term "machine-readable medium" as used herein refers to any medium that participates in providing data that causes a machine to operate in a specific fashion. In an embodiment implemented using the first mobile device 105, various machine-readable medium is involved, for example, in providing instructions to the processor 210 for execution. The machine-readable medium can be a storage media. Storage media includes both non-volatile media and volatile media. Non-volatile media includes, for example, optical or magnetic disks, such as storage unit 225. Volatile media includes dynamic memory, such as the memory 215. All such media must be tangible to enable the instructions carried by the media to be detected by a physical mechanism that reads the instructions into a machine.

Common forms of machine-readable medium include, for example, a floppy disk, a flexible disk, hard disk, magnetic tape, or any other magnetic medium, a CD-ROM, any other optical medium, punch cards, paper-tape, any other physical medium with patterns of holes, a RAM, a PROM, and EPROM, a FLASH-EPROM, any other memory chip or cartridge.

In another embodiment, the machine-readable medium can be a transmission media including coaxial cables, copper wire and fibre optics, including the wires that comprise the bus 205. Transmission media can also take the form of acoustic or light waves, such as those generated during radio-wave and infra-red data communications. Examples of machine-readable medium may include but are not limited to a carrier wave as describer hereinafter or any other medium from which the first mobile device 105 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the first mobile device 105 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on storage unit 225 either before or after execution by the processor 210.

The first mobile device 105 also includes a communication interface 245 coupled to the bus 205. The communication interface 245 provides a two-way data communication coupling to the machine networks 135, 136, 137, 138 of the machines 115, 120, 125, 130 respectively. For example, the communication interface 245 can be an integrated service digital network (ISDN) card or a modem to provide a data communication connection to a corresponding type of telephone line. As another example, the communication interface 245 can be a local area network (LAN) card to provide a data communication connection to a compatible LAN. Wireless links can also be implemented. In any such implementation, the communication interface 245 sends and receives radio, electrical, electromagnetic, or optical signals that carry digital data streams representing various types of information.

The first mobile device 105 may also include one or more sensors 250 coupled to the bus 205. The sensors 250 may enable detection of one or more parameters such as, for example, movements of the first mobile device 105, light, accidental droppage of the first mobile device 105, and audio inputs. Examples of the sensors 250 include, but are not limited to, motion sensors, light sensors, magnetic sensors, and audio sensors.

Figure 3:
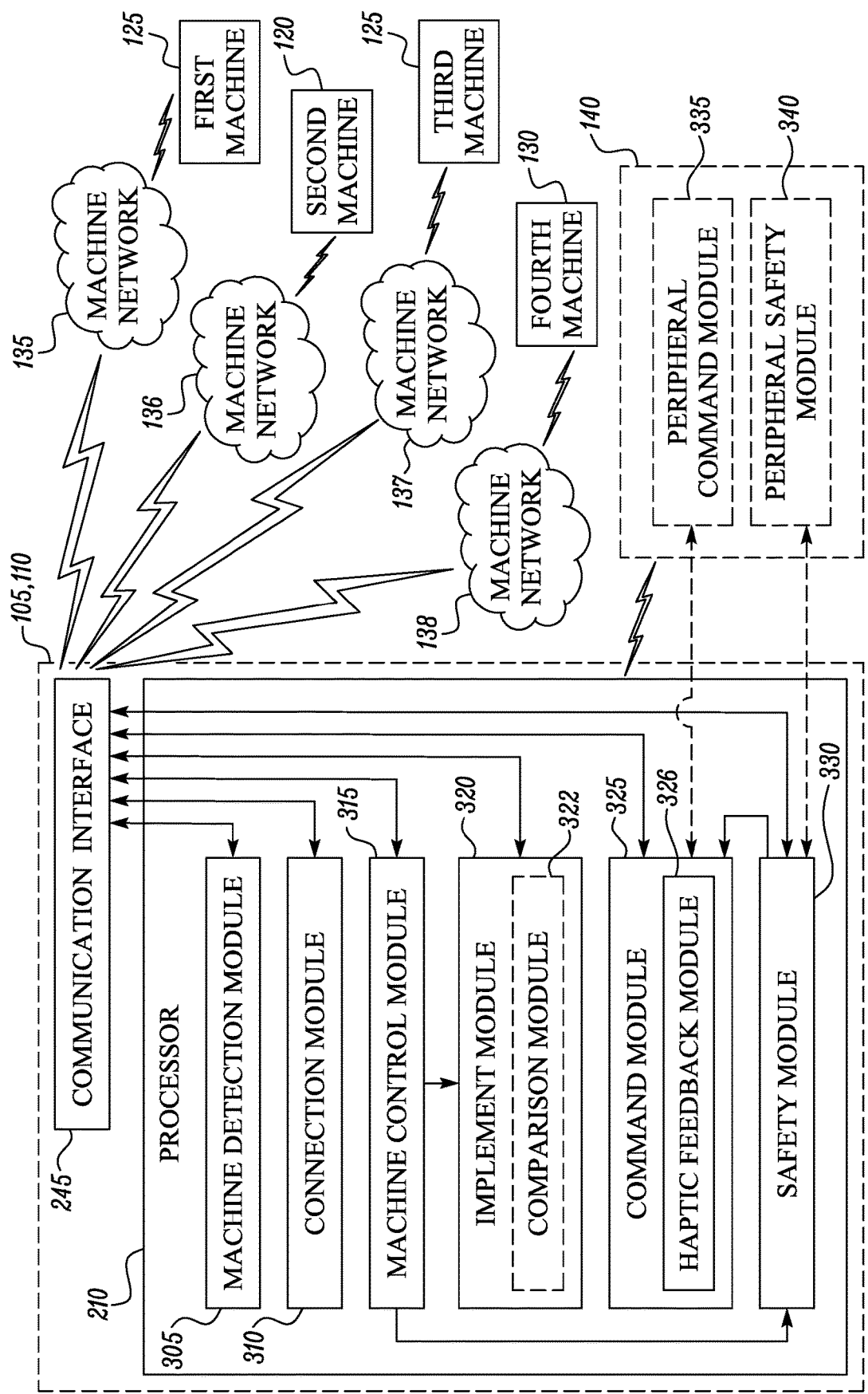
FIG. 3 is a schematic block diagram of a processor of the mobile device of FIG. 2, in accordance with the embodiment of the present disclosure.

In some embodiments, the processor 210 of the first mobile device 105 may be capable of executing the one or more predefined computer instructions in order to perform one or more functions. The processor 210 may also include one or more computer modules 305-330 (as shown in FIG. 3) to perform the one or more functions. In an embodiment, the standalone mobile application may include the instructions corresponding to computer modules 305-330 that may be accessed by the processor 210 via the storage unit 225 and/or the memory 215. The processor 210 may then execute the instructions accessed from the standalone application.

Referring to FIG. 3, the processor 210 may include a machine detection module 305 to detect and display machines 400, including the machines 115, 120, 125, 130 of FIG. 1, on the GUI 401 (see FIG. 4) of the standalone mobile application that is rendered on the display 230 of the first mobile device 105. The machine detection module 305 may detect the machines 400 via the wireless signals, for example, the wireless signals 117, 122, 127, 133 (see FIG. 1), received from the machine networks, for example, the machine networks 135, 136, 137, 138 (see FIG. 1), of the machines 400 respectively. The machine detection module 305 may display the the machines 400 as text, icons, symbols, images, animations, video, and/or live video. The list may include identities of the machines 400 as ascertained by the machine detection module 305 via the wireless signals, for example, the wireless signals 117, 122, 127, 133. The identity of the machines 400 may correspond to name and/or type of the machines 400. For example, the machine detection module 305 may ascertain the first machine 115 as a Load Haul Dump (LHD) Truck, the second machine 120 as a Small Wheel Loader (SWL), the third machine 125 as a Skid Steer Loaders (SSL) loader, and the fourth machine 130 as a Hydraulic Excavators (HEX). The machine detection module 305 may then display the the machines 400 as text, icons, symbols, images, animations, video, and/or live video on the GUI 401 of the standalone application in the first mobile device 105.

Figure 4:
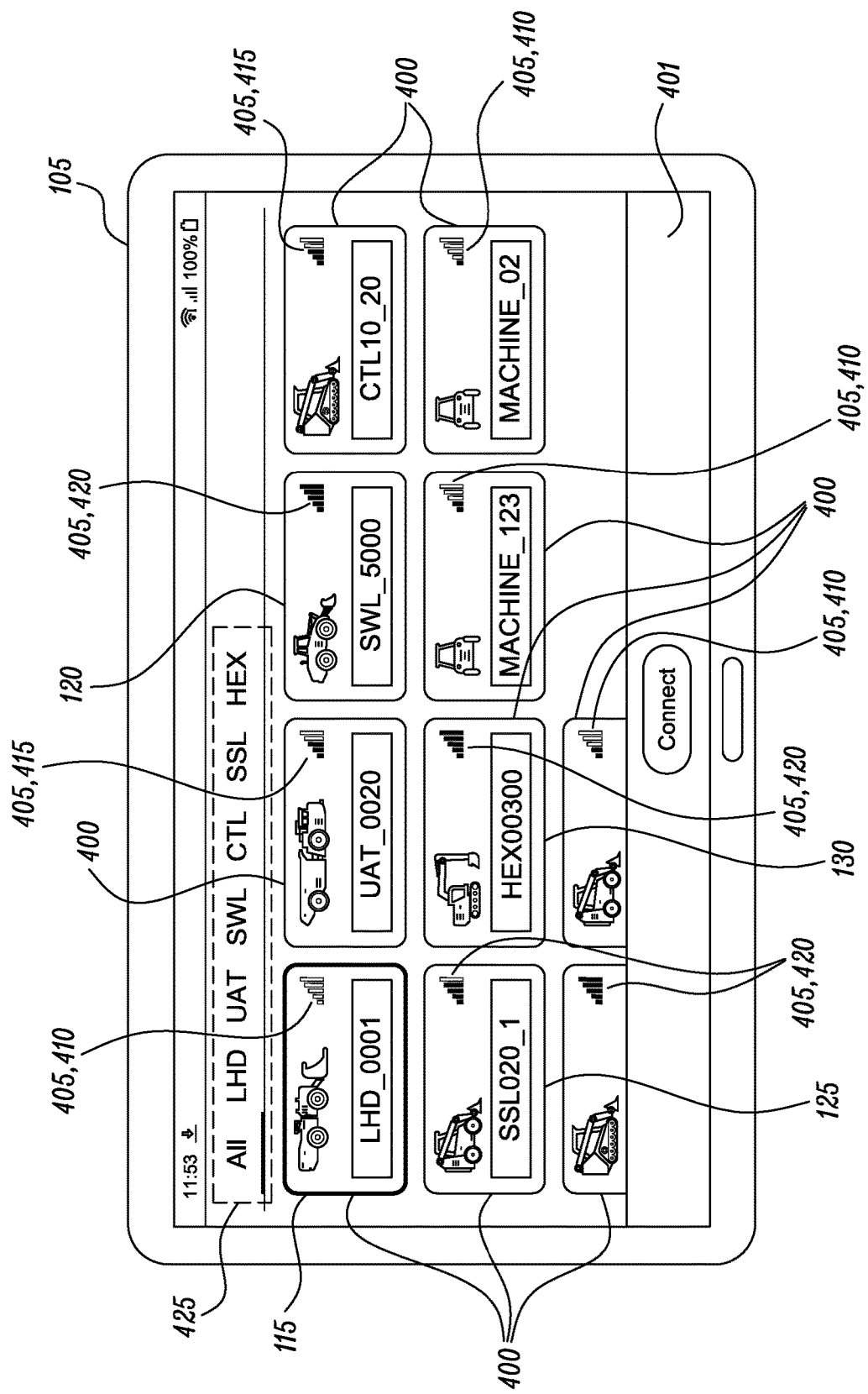
FIG. 4 is an exemplary illustration of different types of machines detected and displayed on a GUI of a standalone application installed in the mobile device of FIG. 2, in accordance with the embodiment of the present disclosure.

Referring to FIG. 4, an exemplary illustration of the machines 400 being detected by the machine detection module 305 of FIG. 3 and displayed on the first mobile device 105 via the standalone mobile application is being disclosed. The machine detection module 305 may also detect and display the strength 405 of the wireless signals, for example, the wireless signals 117, 122, 127, 133 (see FIG. 1), originating from the machines 400. The machine detection module 305 may also graphically display the strength 405 of the wireless signals as "weak" signals 410, "moderate" signals 415 and/or "strong" signals 420 depending on the proximity of the machines 400 with respect to the first mobile device 105. For example, a "strong" wireless signal 420 of the HEX excavator 130 may indicate that the HEX excavator 130 may be within the line-of-sight of an operator, for example, the first operator 106 of the first mobile device 105. In some embodiments, the machine detection module 305 may also classify and segregate the machines 400 detected based on the type of the machines 400 identified. For example, the machine detection module 305 may display the machines 400 identified as LHD, Underground Art Truck (UAT), SWL, SSL, Cut-to-Length (CTL) machine, and HEX separately as multiple lists 425 of the machines 400 based on the type of the machines 400 identified.

Referring again to FIG. 3, the processor 210 also includes a connection module 310 to request and establish a wireless connection with the machines 400 via the wireless signal transmitted by the machines 400. In one embodiment, the connection module 310 may be able to request and establish the wireless connection with one of the machines 400 at a given point in time. In another embodiment, the connection module 310 may be able to request and establish the wireless connection with the machines 400 simultaneously. The connection module 310 may be able to establish the wireless connection successfully depending on the strength 405 of the wireless signals, for example, the wireless signals 117, 122, 127, 133 (see FIG. 1). For example, the connection module 310 may be able to establish the wireless connection successfully with the HEX excavator 130 displayed as having the "strong" wireless signal 420. In order the establish the wireless connection with the machines 400 the operator, for example, the first operator 106 of the first mobile device 105 may have to select one of the machines 400 displayed on the GUI 401 of the standalone mobile application and request the wireless connection with the first machine 115. The first operator 106 of the first mobile device 105 may select the first machine 115 via the GUI 401 of the standalone application and establish the wireless connection between the first mobile device 105 and the first machine 115.

The processor 210 may also include a machine control module 315 to retrieve and track machine related information from the first machine 115 upon successful establishment of the wireless connection with the first machine 115. In one embodiment, the machine control module 315 may retrieve the machine related information by transmitting a request to the first machine 115 and receive the machine related information corresponding to the request from the first machine 115 via the communication interface 245 (see FIG. 2). In another embodiment, the machine control module 315 may automatically receive the machine related information from the first machine 115 upon the establishment of the wireless connection by the connection module 310.

Figure 5:
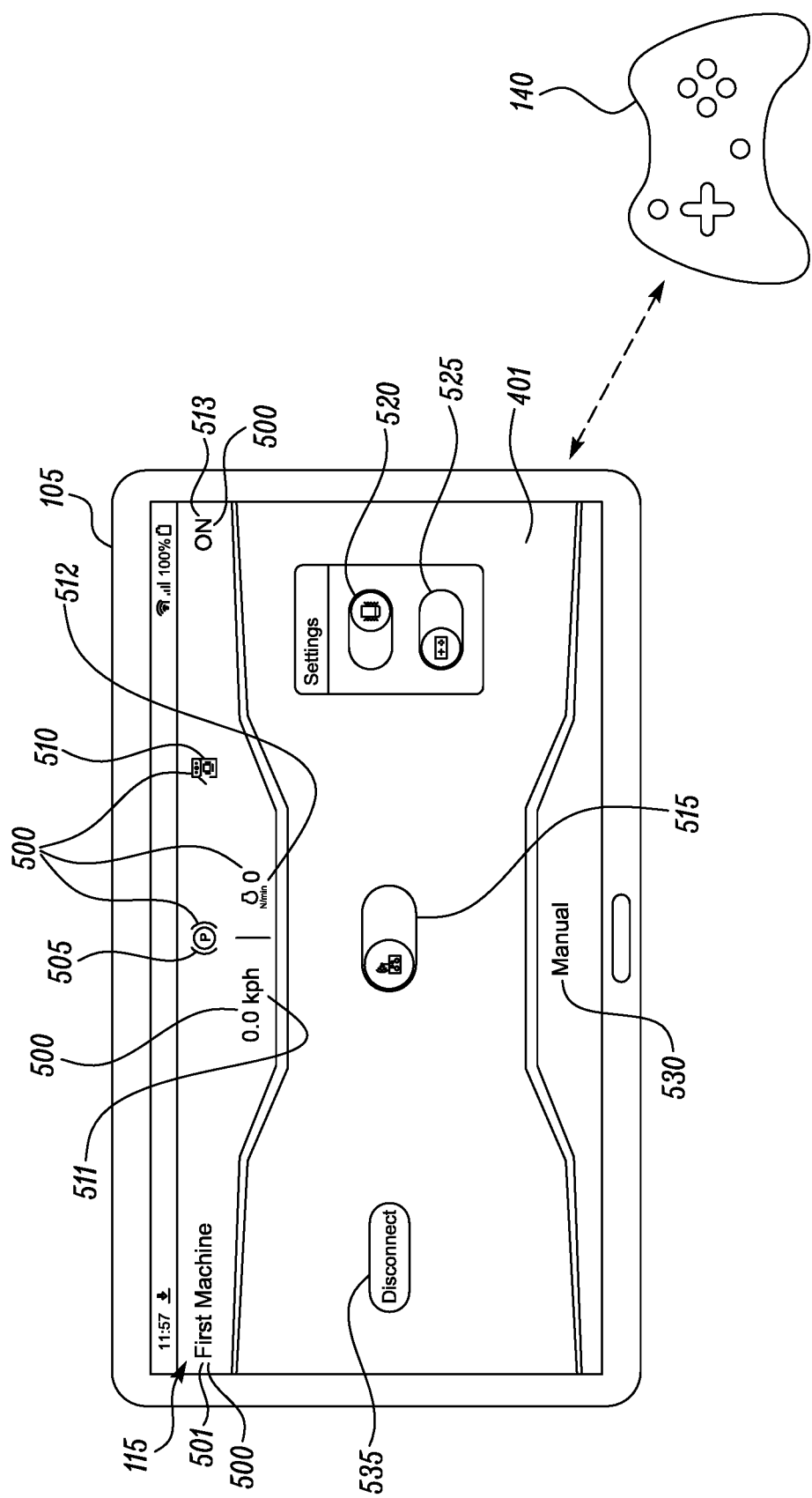
FIG. 5 is an exemplary illustration of a wireless connection established between the mobile device of FIG. 2 and a first machine of FIG. 4, in accordance with the embodiment of the present disclosure.
Figure 6:
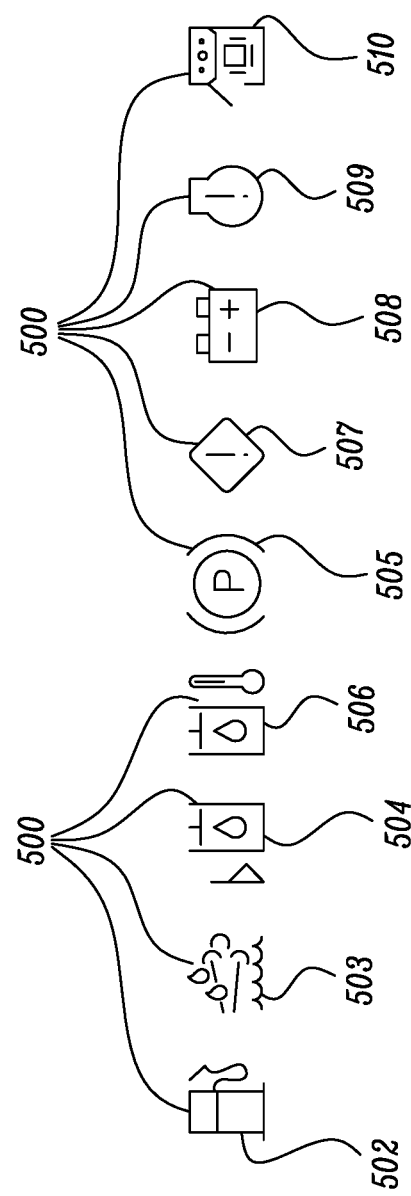
FIG. 6 is an exemplary illustration of machine parameters retrieved from the first machine of FIG. 4 and displayed on the mobile device of FIG. 2, in accordance with the embodiment of the present disclosure.
Figure 7:
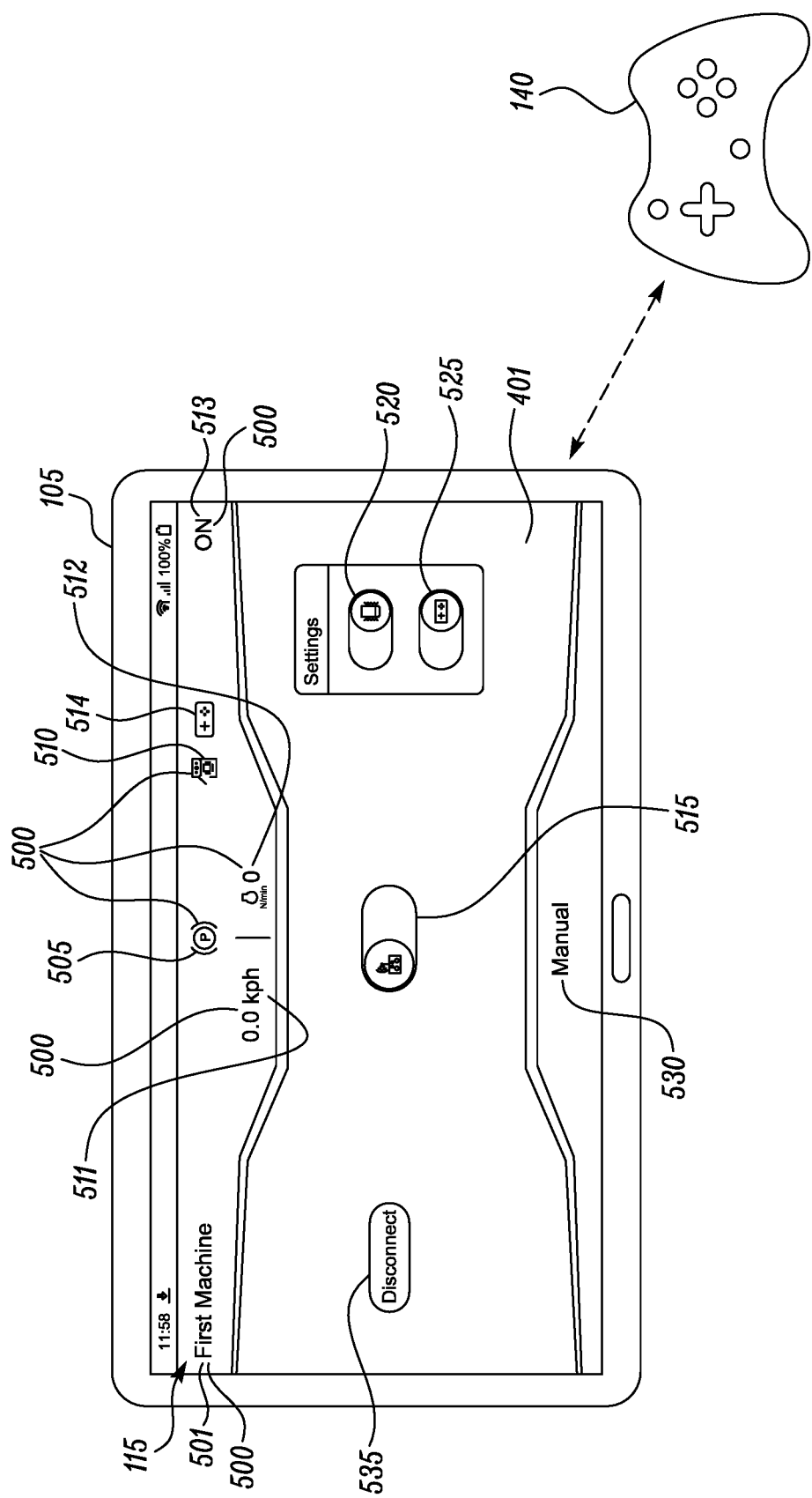
FIG. 7 is an exemplary illustration of the mobile device of FIG. 2 being paired with a peripheral input device, in accordance with the embodiment of the present disclosure.

Referring to FIGS. 5-7, the machine related information retrieved from the first machine 115, for example, the Load Haul Dump (LHD) Truck, by the machine control module 315 (see FIG. 3) is disclosed. The machine related information may correspond to telemetry data received from the first machine 115. The machine related information may include, but is not limited to, machine parameters 500 of the first machine 115 and a Boolean state of the machine parameters 500. Examples of the machine parameters 500 may include, but are not limited to, machine description, fuel level, urea level, hydraulic oil level, oil temperature, engine coolant temperature, parking brake status, battery status, engine status, machine alert status, machine door status, machine gear status, engine rpm, and machine speed of the first machine 115. The machine control module 315 may also display the machine parameters 500 retrieved from the first machine 115 on the GUI 401 of standalone application. The machine parameters 500 may be displayed as text, icons, symbols, images, animations, video, and/or live video. In an exemplary example, the machine parameters 500 including the machine description, the machine speed, the engine rpm, and the machine gear status may be displayed as text 501, 511, 512, and 513 respectively. Further, the machine parameters 500 including the fuel level, the urea level, the hydraulic oil level, the parking brake status, the oil temperature, machine alert status, the battery status, the engine status, and the machine door status may be displayed as icons 502-510 (see FIG. 6) respectively. The Boolean state of the machine parameters 500 may correspond to, but not limited to, an "on-off" state, an "open-close" state, and/or a conditional state of the machine parameters 500. For example, the Boolean state of the parking brake status may correspond to the "on-off" state that may indicate the application or closing of parking brake in the first machine 115. Also, the Boolean state of the machine door status may correspond to the "open-close" state that may indicate that the machine door of the first machine 115 may be open or closed. Further, the Boolean state of the fuel level status may correspond to the conditional state that may indicate that a level of fuel in the first machine 115 is low or not, critical or not, and/or empty or not. Accordingly, the machine control module 315 may also display the machine parameters 500 depending on the Boolean state of the machine parameters 500. For example, the fuel level icon 502 may be displayed for instances when the Boolean state of the machine parameter 500 corresponding to the fuel level is true for a low or critical level of fuel in the first machine 115. Similarly, the parking brake icon 505 may be displayed for instances when the Boolean state of the machine parameter 500 corresponding to the parking brake is true for the application of the parking brake in the first machine 115. In addition, the machine control module 315 may also display the machine parameters 500 in one or more colours that may be indicative of the Boolean state of the machine parameters 500. For example, the machine control module 315 may display the parking brake icon 505 in red colour for instances when the Boolean state of the machine parameter 500 corresponding to the parking brake is true for the application of the parking brake in the first machine 115. Similarly, the machine control module 315 may display the fuel level icon 502 in yellow colour for instances when the Boolean state of the machine parameter 500 corresponding to the fuel level is true for the low level of fuel in the first machine 115. The machine control module 315 may also track or monitor the Boolean state of the machine parameters 500 constantly in real-time or in pre-defined time intervals until the wireless connection established between the first mobile device 105 and the first machine 115 is intact.

The machine control module 315 may also display a remote-control option 515 on the GUI 401 of the standalone mobile application to the first operator 106. The remote-control option 515 may enable the first operator 106 to reserve the first machine 115 for operation and acquire access to remotely control the first machine 115. The remote-control option 515 may also allow the first operator 106 to relinquish the access to remotely control the first machine 115 in order to facilitate manual operation of the first machine 115. The machine control module 315 may also display a connection indicator 530 to indicate different modes of the wireless connection established between the first mobile 105 and the first machine 115. The modes of the wireless connection may include, but are not limited to, "Manual", "Reserved", or "Tele-remote". The "Manual" mode (see FIG. 5-6) of the wireless connection established may indicate that the first machine 115 is available for or in manual operation. The "Reserved" mode (see FIG. 7) of the wireless connection established may indicate that the first machine 115 has been reserved for operation using the first mobile device 105. The "Tele-remote" mode (see FIG. 8) of the wireless connection established may indicate that the first machine 115 is under the remote-control of the first mobile device 105.

In some embodiments, the machine control module 315 may also display and enable a haptic feedback option 520 and a peripheral device option 525. The haptic feedback option 520 displayed by the machine control module 315 may enable the first operator 106 to opt for a haptic feedback to be enabled in the mobile device 105 during the remote-control of the first machine 115. The haptic feedback may correspond to at least one of a vibration of the first mobile device 105 and/or an audio feedback corresponding to one or more actions performed by the first operator 106 using the first mobile device 105. The peripheral device option 525 may allow the first operator 106 to connect or pair the first mobile device 105 with the peripheral input device 140 (see FIG. 1) and enable the peripheral input device 140 to be operated as the input device 235 (see FIG. 2) for the first mobile device 105. The machine control module 315 may enable connection with the peripheral input device 140 via different connection methods such as, for example, a Bluetooth connection, a Wi-Fi Direct connection, a wired connection, and/or a LAN connection. The machine control module 315 may also display a peripheral device indicator 514 (see FIG. 7) upon successful connection with the peripheral input device 140. The machine control module 315 may also display a disconnection option 535 to enable the first operator 106 to disconnect the wireless connection established between the first mobile device 105 and the first machine 115.

Upon activation of the remote-control option 515 by the first operator 106 (see FIG. 1) of the first mobile device 105, the machine control module 315 may display the "Reserved" mode of the wireless connection via the connection indicator 530 indicating that the first machine 115 is reserved for operation using the first mobile device 105. In some embodiments, the machine control module 315 may enable the first operator 106 to reserve the machines 400 simultaneously.

Referring again to FIG. 3, the processor 210 may also include an implement module 320 configured to display implements 800 (see FIG. 8) of the first machine 115 once the "Reserved" mode of the wireless connection is established. The machine related information retrieved by the machine control module 315 may include the implements 800 of the first machine 115 that may be accessed and displayed by the implement module 320. In an embodiment, the machine control module 315 may also track or monitor the machine related information for changes in the implements 800 by the retrieving the machine related information from the first machine 115 in real-time or in predefined time intervals. The implement module 320 may also display a change in the implements 800 displayed corresponding to the changes detected by the machine control module 315 in the implements 800 retrieved from the first machine 115.

Figure 8:
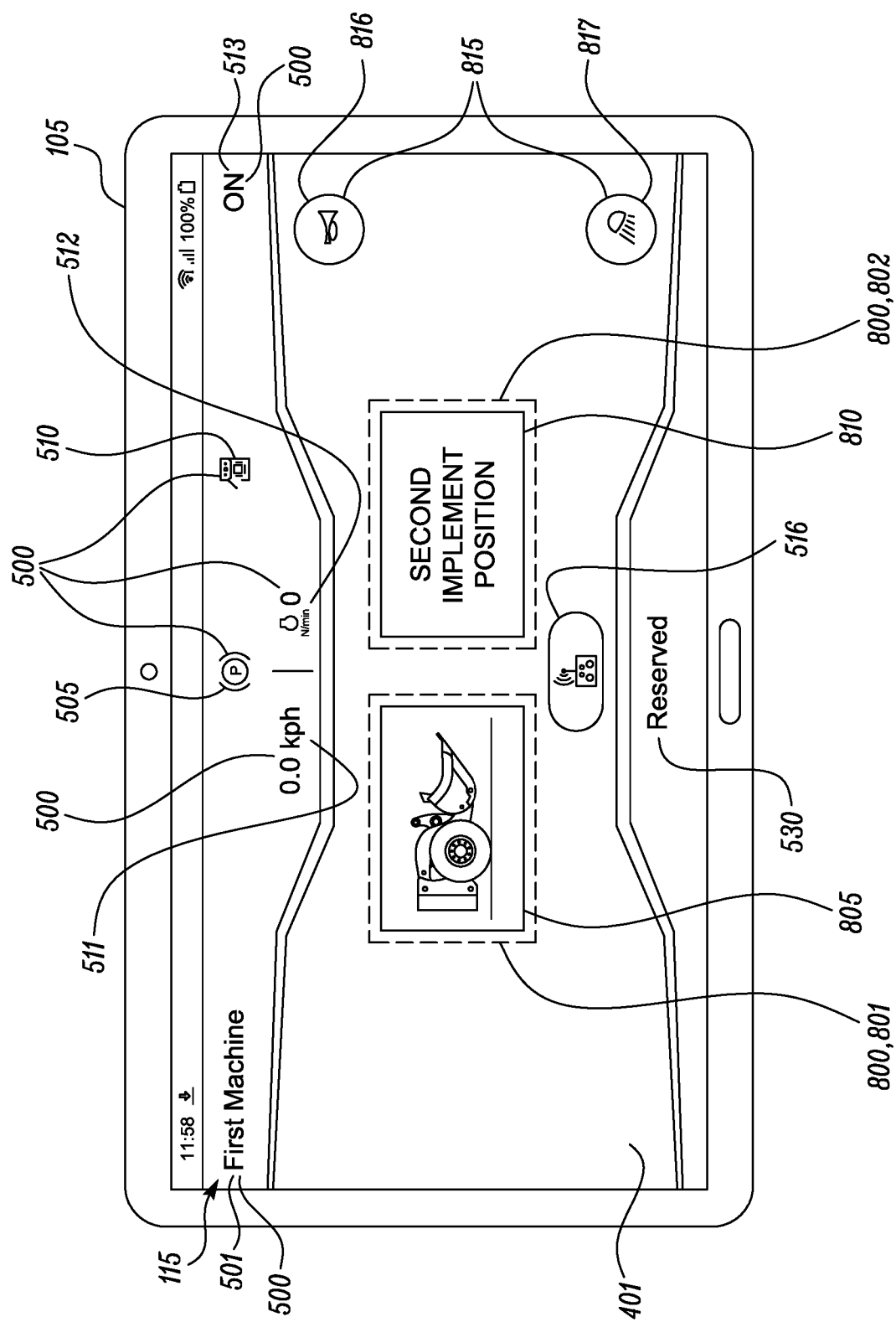
FIG. 8 is an exemplary illustration of implements and accessories retrieved from the first machine of FIG. 4 and displayed on the mobile device of FIG. 2, in accordance with the embodiment of the present disclosure.

Referring to FIG. 8, the implements 800 displayed by the implement module 320 of FIG. 3 on the GUI 401 of the standalone application is disclosed. The implements 800, for example, a first machine implement 801 and a second implement 802, may be displayed as text, icons, symbols, images, animations, and/or live video on the GUI 401. The implement module 320 may also retrieve and display spatial positions 805, 806 of the implements 801, 802 on the GUI 401 as text, icons, symbols, images, animations, video, and/or live video. The implement module 320 may also simultaneously display the remote-control option 515 (see FIG. 7) in an active state 516 indicating that the implements 800 may be reserved for the first mobile device 105 to control and operate.

In one embodiment, the implement module 320 may also optionally include a comparison module 322 (see FIG. 3) to compare the implements 800 retrieved from the first machine 115 with the pre-defined implements (not shown) included in the standalone application of the first machine 115. The comparison module 322 may access the pre-defined implements from the storage unit 225 (see FIG. 2) of the first mobile device 105. The comparison module 322 may then identify one or more implements 800 that are identical and non-identical with the pre-defined implements respectively. In an embodiment, the implement module 320 may display the implements 800 that are identical and may exclude, hide, or disable the implements 800 that are non-identical on the GUI 401 of the standalone application.

In another embodiment, the implement module 320 may not include the comparison module 322 and display either of the implements 800 retrieved from the first machine 115 or the predefined implements accessed from the storage unit 225. The implement module 320 may display the predefined implements for instances when the machine control module 315 is unable to retrieve the implements 800 from the first machine 115.

The implements 800 may correspond to parts, tools, or implements of the first machine 115 that are configured to perform one or more tasks. Examples of the implements 800 include, but are not limited to, machine wheels, loader arms, loader buckets, loader mount forks, clamshell bucket, angle broom, backhoe, bale forks, box blade, boring unit, brush saw, rotary cutters, chippers, concrete mixer, diggers, tillers, augers, hammers, couplers, grapples, multi-processors, rakes, rippers, and thumbs. Examples of the one or more tasks may include, but are not limited to, loading, scraping, excavation, drilling, unloading or load dumping, and/or material transport. The implement module 320 may also display accessories 815 of the first machine 115 and/or the implements 800 on the GUI 401 as text, icons, symbols, images, animations, video, and/or live video. The machine related information retrieved by the machine control module 315 may include the accessories 815 of the first machine 115 that may be accessed and displayed by the implement module 320. In an embodiment, the machine control module 315 may also track or monitor the machine related information for changes in accessories 815 by retrieving the machine related information from the first machine 115 in real-time or in predefined time intervals. The implement module 320 may also display a change in the accessories 815 displayed corresponding to the changes detected by the machine control module 315 in the accessories 815 retrieved from the first machine 115. Examples of the accessories 815 include, but are not limited to, horn, lights, and implement attachments such as, for example, a bale grappler affixed to the bucket implement. For example, the implement module 320 may display the horn and the lights of the first machine 115 as icons 816, 817 respectively.

The implement module 320 may also enable the first operator 106 to select an implement for example, a first machine implement 801 of the first machine 115 via the GUI 401 of the standalone application in order to remotely control the first machine implement 801.

Figure 9:
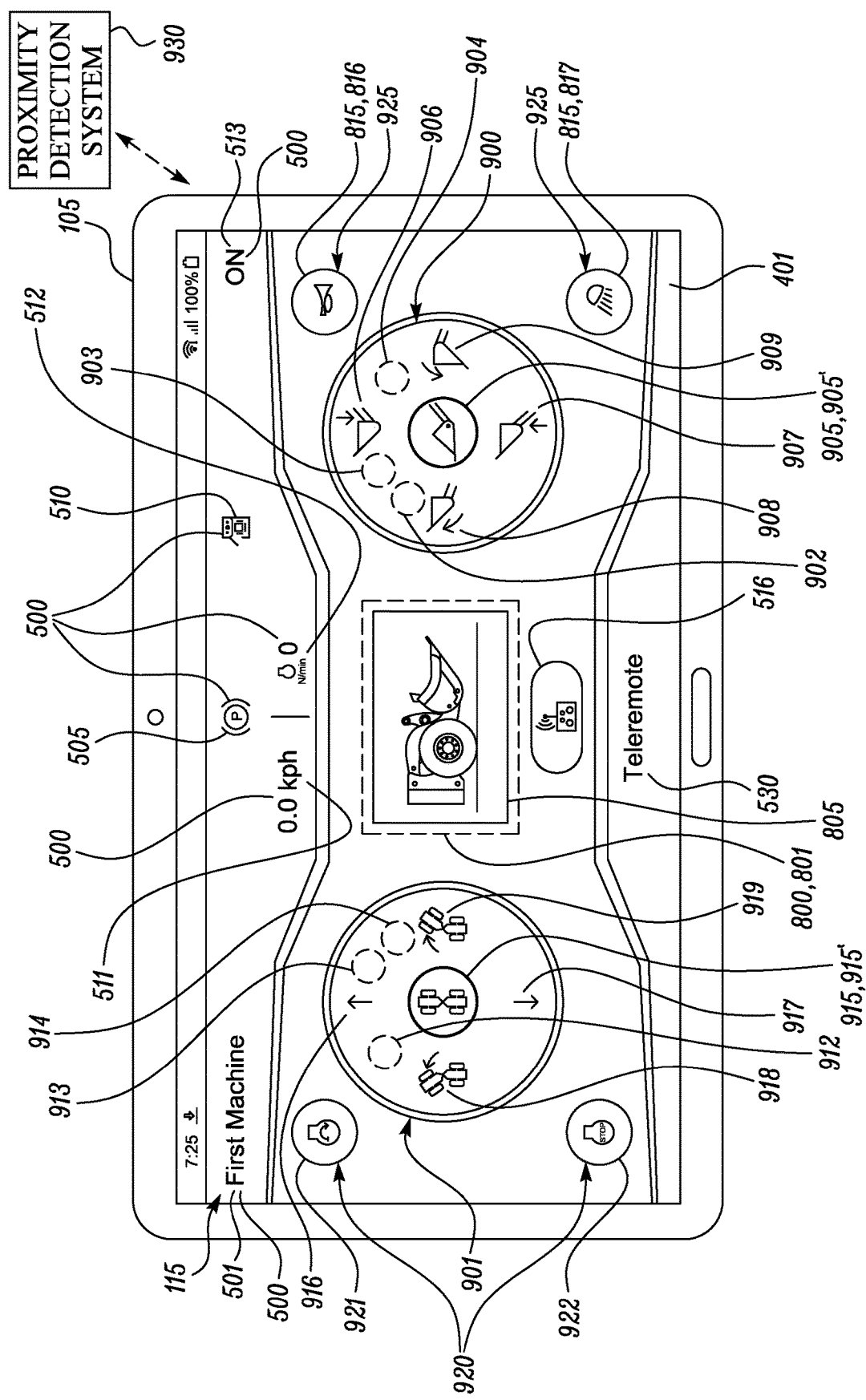
FIG. 9 is an exemplary illustration of controls associated with the first machine of FIG. 4 being retrieved from the first machine and displayed on the mobile device of FIG. 2, in accordance with the embodiment of the present disclosure.

Referring to FIG. 9, the implement module 320 of FIG. 3 may record the selection of the first machine implement 801 and may display controls 906-909, 916-919, 921-922, 925 corresponding to the first machine 115, the first machine implement 801, and the accessories 815 of the first machine 115 respectively. The machine related information retrieved by the machine control module 315 may include the controls 906-909, 916-919, 921-922, 925 of the first machine 115 that may be accessed and displayed by the implement module 320. In an embodiment, the machine control module 315 may also track and/or monitor the machine related information for changes in the controls 906-909, 916-919, 921-922, 925 by retrieving the machine related information from the first machine 115 in real-time or in predefined time intervals. Further, the machine control module 315 may also display the "Teleremote" mode of the wireless connection via the connection indicator 530. The "Teleremote" mode of the wireless connection may accordingly indicate to the first operator 106 that the first machine implement 801 is under the remote-control of the first mobile device 105 and may be wirelessly controlled by the first mobile device 105. In some embodiments, the comparison module 322 may compare the controls 906-909, 916-919, 921-922, 925 retrieved from the first machine 115 with the predefined controls included in the standalone application of the first machine 115. The comparison module 322 may then the controls 906-909, 916-919, 921-922, 925 that are identical and non-identical with the predefined controls. In an embodiment, the implement module 320 may display the controls 906-909, 916-919, 921-922, 925 that are identical and may exclude, hide, or disable the controls 906-909, 916-919, 921-922, 925 that are non-identical on the GUI 401 of the standalone application. The controls 906-909, 916-919, 921-922, 925 may be displayed as text, icons, symbols, images, animations, video, and/or live video on the GUI 401 of the standalone application. Examples of the controls 906-909, 916-919, 921-922, 925 include, but are not limited to, implement manoeuvres 906-909, machine manoeuvres 916-919, engine controls 921-922, and accessory controls 925. The implement manoeuvres 906-909 may correspond to, but not limited to, vertical movements 906, 907 and horizontal or angular movements 908, 909 of the first machine implement 801. In some embodiments, the implement manoeuvres 906-909 may also correspond to radial movements and/or axial movements of the first machine implement 801. The machine manoeuvres 916-919 may correspond to a forward movement 916, a backward movement 917, a leftward movement 918, and a rightward movement 919 of the first machine 115. In some embodiments, the machine manoeuvres 916-919 may also correspond to an upward and/or a downward movement of the first machine 115. The engine controls 921-922 may correspond to engine start 921 and engine stop 922 (see FIG. 9) of the first machine 115. The accessory controls 925 may correspond to functions related to the accessories 815 of the first machine 115, for example, activating or de-activating the horn via the icon 816 and/or switching on or off the lights via the icon 817.

Referring again to FIG. 3, the processor 210 may also include a command module 325 to receive input commands to be transmitted to the first machine 115 from the first operator 106 (see FIG. 1) via the input device 235 (see FIG. 2). The command module 325 may receive the input commands from the first operator 106 corresponding to the controls 906-909, 916-919, 921-922, 925 (see FIG. 9) displayed by the implement module 320. The command module 325 may also receive the input commands corresponding to combinations of the controls 906-909, 916-919, 921-922, 925 such as, for example, a combination of the vertical movement 906 and the angular movement 909 of the first machine implement 801.

The command module 325 may include a haptic feedback module 326 that may provide the haptic feedback such as, vibration of the first mobile device 105 and/or audio feedback corresponding to the input command being received. The haptic feedback module 326 may be activated for instances when the first operator 106 (see FIG. 1) has opted for the haptic feedback via the haptic feedback option 520 (see FIG. 7).

For example, referring to FIG. 9, the first mobile device 105 may have a multi-touch enabled touch screen as the input device 235 (see FIG. 2) of the first mobile device 105. In one embodiment, the command module 325 (see FIG. 3) may display command joysticks 905, 915 at predefined default positions such as, for example, central positions 905', 915' within control areas 900, 901 respectively on the GUI 401. The command joysticks 905, 915 may be moved, displaced, and/or positioned at different control locations from the central positions 905', 915' within the control areas 900, 901 of the GUI 401 by the first operator 106 via the touch screen. In an embodiment, the control locations may correspond to positions of the controls 906-909, 916-919 displayed by the implement module 320 (see FIG. 3) within the control areas 900, 901. The control locations may also correspond to intermediate positions such as, for example, 902-904, 912-914 in between the controls 906-909, 916-919 displayed by the implement module 320.

Accordingly, the command joysticks 905, 915 may then be positioned by the first operator 106 at the different control locations such as, for example, 902-904, 906-909 and 912-914, 916-919 within the control areas 900, 901. The command module 325 may then register the positioning of the command joysticks 905 and 915 at the control locations as the input commands corresponding to the controls 906-909, 916-919 and/or the combinations of the controls 906-909, 916-919. For example, the first operator 106 (see FIG. 1) may position the command joystick 905 at the control position 906 that corresponds to the vertical movement 906 of the first machine implement 801. The first operator may then position the command joystick 905 at the control position 904 that may correspond to a combination of the vertical movement 906 and angular movement 909 of the first machine implement 801.

In another embodiment, the command module 325 may register a direct selection of the controls 906-909, 916-919 by first operator 106 via the touchscreen as the input commands corresponding to the controls 906-909, 916-919. The first operator 106 may register one or more touches corresponding to the controls 906-909, 916-919 that may be recorded by the command module 325 as input commands corresponding to the controls 906-909, 916-919. The command module 325 may also register a direct selection of the combinations of the controls 906-909, 916-919 by first operator 106 as input commands corresponding to the combinations of the controls 906-909, 916-919. The first operator 106 may register one or more touches corresponding to the control positions 902-904, 912-914 that may be recorded by the command module 325 as input commands corresponding to the combinations of the controls 906-909, 916-919.

The command module 325 may also ascertain a percentage of power to be applied by the first machine 115 corresponding to the controls 906-909, 916-919 and/or the combination of the controls 906-909, 916-919. The command module 325 may ascertain the percentage of power based on the positioning of the command joysticks 905, 915 or the position of the direct selection by the first operator 106 (see FIG. 1) inside the control areas 900, 901 respectively via the input device 235 (see FIG. 2). The command module 325 may also assign the percentage of power ascertained in the input commands to be transmitted to the first machine 115. In an embodiment, the percentage of power may be proportional to the position and a proximity of the command joysticks 905, 915 with respect to the controls 906-909, 916-919 displayed respectively. Further, the percentage of power may vary in infinitesimal increments from 0 to 100 percent corresponding to the positioning of the command joysticks 905, 915 with respect to the controls 906-909, 916-919 displayed.

For example, for instances when the command joystick 905 is positioned by the first operator 106 at the control position 906, the command module 325 may ascertain and assign 100 percent power to be applied by the first machine 115 corresponding to the vertical movement 906 of the first machine implement 801. Similarly, for instances when the command joystick 905 is positioned at the control position 904 that may be equidistant from the control position 906 and the control position 909, the percentage of power ascertained by the command module 325 corresponding to the vertical movement 906 may vary from 100 percent to 50 percent. In addition, the percentage of power ascertained by the command module 325 corresponding to the angular movement 909 may vary from 0 percent to 50 percent. Hence, the command module 325 may assign 50 percent power to be applied corresponding to the vertical movement 906 and 50 percent power to the angular movement 909 respectively of the first machine implement 801. Accordingly, for instances when the command joystick 905 is positioned at the control position 903, the command module 325 may ascertain and assign 80 percent power to be applied by the first machine 115 corresponding to the vertical movement 906 and 20 percent power to be applied corresponding to the angular movement 909 of the first machine implement 801. For instances when the command joystick 905 is positioned at the control position 902, the command module 325 may ascertain and assign 20 percent power to be applied by the first machine 115 corresponding to the vertical movement 906 and 80 percent power to be applied corresponding to the angular movement 909 of the first machine implement 801.

Similarly, for instances when the command joystick 915 is positioned at the control position 918, the command module 325 may ascertain and assign 100 percent power to be applied by the first machine 115 corresponding to the leftward movement 918 of the first machine 115. Similarly, for instances when the command joystick 915 is positioned at the control position 912 that may be equidistant from the control position 916 and the control position 918, the command module 325 may ascertain and assign 50 percent power to be applied corresponding to the leftward movement 918 and the forward movement 916 respectively of the first machine 115. Further, for instances when the command joystick 915 is positioned at the control position 913, the command module 325 may ascertain and assign 80 percent power to be applied by the first machine 115 corresponding to the forward movement 916 and 20 percent power to be applied corresponding to the rightward movement 919 of the first machine 115. For instances when the command joystick 915 is positioned at the control position 914, the command module 325 may ascertain and assign 20 percent power to be applied by the first machine 115 corresponding to the forward movement 916 and 80 percent power to be applied corresponding to the rightward movement 919 of the first machine 115.

The command module 325 may also register the touches made by the first operator 106 (see FIG. 1) corresponding to the controls 921-922, 925 as input commands corresponding to the controls 921-922, 925. The command module 325 may also allow the first operator 106 to provide multiple input commands simultaneously corresponding to the controls 906-909, 916-919, 921-922, 925 and/or the combinations of the controls 909, 916-919, 921-922, 925 via the touchscreen. For example, the first operator 106 may register touches corresponding to the forward movement 916 of the first machine 115 via the GUI 401 and simultaneously register touches corresponding to the accessory control 925 of the horn of the first machine 115 via icon 816. In another example, the first operator 106 may register touches corresponding to the leftward movement 918 of the first machine 115 via the GUI 401 and simultaneously register touches corresponding to the vertical movement 906 of the first machine implement 801. The first operator 106 may also withdraw the touches corresponding to the leftward movement 918 and the vertical movement 906 in order to stop the leftward movement 918 of the first machine 115 and the vertical movement 906 of the first machine implement 801.

Further, the command module 325 may also register a stoppage of input from the input device 235 such as, for example, withdrawal of the touches from the touchscreen, as the input commands with instructions to stop execution of the controls 906-909, 916-919, 921-922, 925 and/or the combination of the controls 906-909, 916-919, 921-922, 925. In one embodiment, the stoppage of input may be detected by the command module 325 corresponding to a touch deselection of the controls 906-909, 916-919, 921-922, 925 previously selected by the first operator 106 (see FIG. 1) via the input device 235. In another embodiment, the stoppage of input may be detected by the command module 325 in response to a withdrawal of the command joysticks 905, 915 or withdrawal of the direct selection by the first operator 106 from the control positions such as, for example, 902-904, 906-909 and 912-914, 916-919. In an embodiment, the command module 325 may also automatically revert the command joysticks 905, 915 to the respective predefined default positions such as, for example, the central positions 905', 915' upon the withdrawal of the command joysticks 905, 915 from the respective control positions.

Referring again to FIG. 3, the first mobile device 105 may also be connected to or paired with the peripheral input device 140 (see FIG. 1) as the input device 235 (see FIG. 2) of the first mobile device 105. In an embodiment, the peripheral input device 140 may include a peripheral command module 335 configured to receive and relay the input commands from the first operator 106 corresponding to the controls 906-909, 916-919, 921-922, 925 (see FIG. 9) to the first mobile device 105. The peripheral command module 335 may receive the input commands via one or more button inputs and/or joystick levers for instances when the peripheral input device 140 corresponds to the joystick or one or more touch screen inputs for instances when the peripheral input device 140 corresponds to the wearable device such as, for example, the smart watch. The peripheral command module 335 may correspond to hardware and/or software components provided in the peripheral input device 140. The command module 325 may be configured to receive the input commands from the first operator 106 via the peripheral input device 140 and map the input commands corresponding to the controls 906-909, 916-919, 921-922, 925 and/or the combination of the controls 906-909, 916-919, 921-922, 925 respectively.

Figure 10:
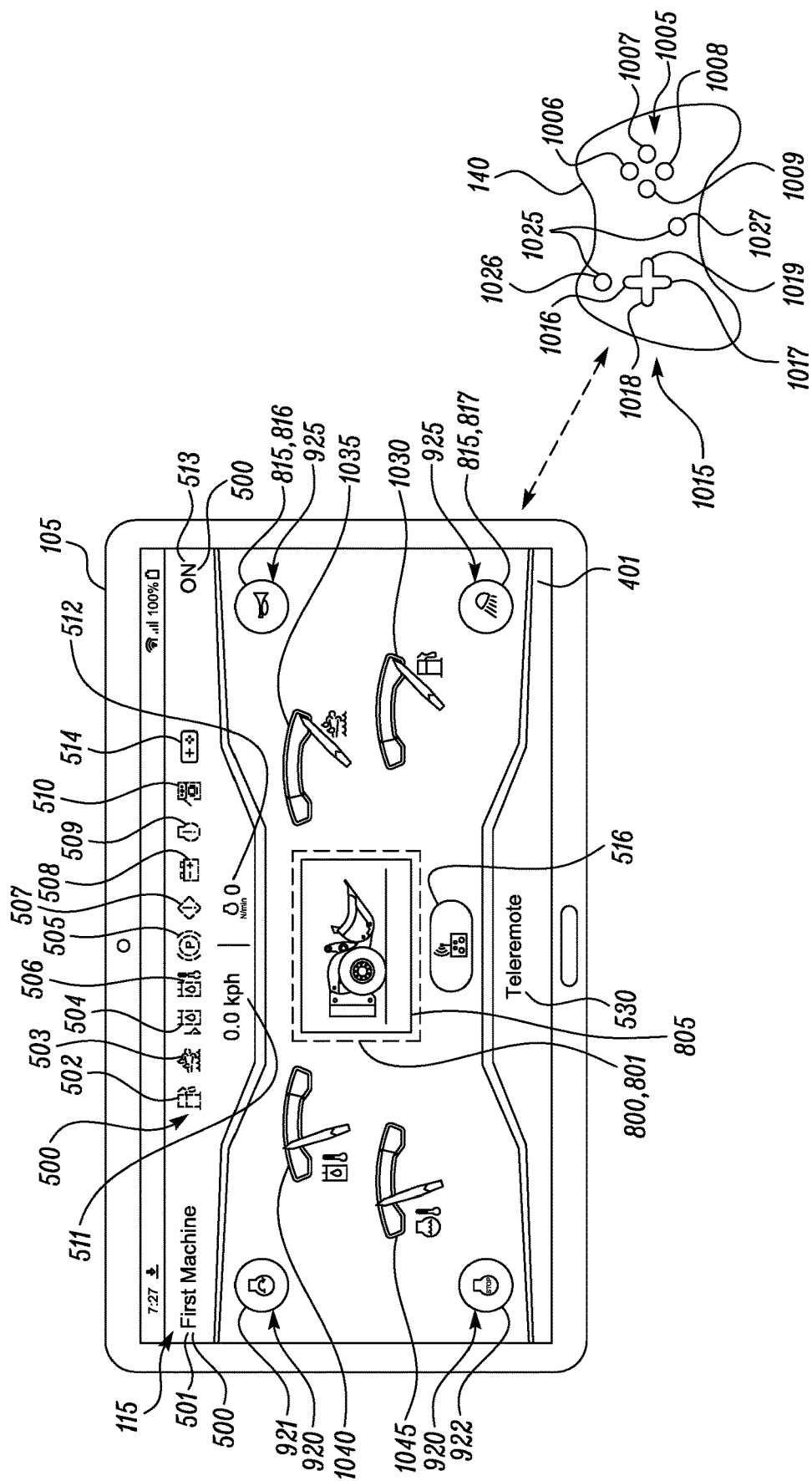
FIG. 10 is an exemplary illustration of the mobile device of FIG. 2 being paired with the peripheral input device of FIG. 7 and the controls of FIG. 9 being mapped with controls provided in the peripheral input device, in accordance with the embodiment of the present disclosure.

For example, referring to FIG. 10, the first mobile device 105 may be connected to or paired with the peripheral input device 140 that corresponds to the joystick as the input device 235 (see FIG. 2) of the first mobile device 105. The peripheral input device 140 may include one or more groups of button inputs 1005, 1015, 1125 having button inputs 1006-1009, 1016-1019, 1026-1027 respectively. In some embodiments, the joystick levers (not shown) may be provided in the peripheral input device 140 in place of the groups of button inputs 1005, 1015, 1125 and the joystick levers may be configured to activate button inputs 1006-1009, 1016-1019, 1026-1027 via axial and/or radial movements of the joystick levers. The first operator 106 may register the button inputs 1006-1009, 1016-1019, 1026-1027 corresponding to the controls 906-909, 916-919, 921-922 respectively by pressing the button inputs 1006-1009, 1016-1019, 1026-1027 independently. The first operator 106 may also register the button inputs 1006-1009, 1016-1019, 1026-1027 corresponding to the combination of the controls 906-909, 916-919, 921-922, 925 by pressing the 1006-1009, 1016-1019, 1026-1027 in combination. Further, the command module 325 may map and record the button inputs 1006-1009, 1016-1019, 1026-1027 as the input commands corresponding to the controls 906-909, 916-919, 921-922 and/or the combination of the controls 906-909, 916-919, 921-922, 925. For example, the command module 325 may map the button inputs 1005 including buttons 1006, 1007, 1008, 1009 to the vertical movements 906, 907 (see FIG. 9) and horizontal or angular movements 908, 909 (see FIG. 9) of the first machine implement 801. Similarly, the command module 325 may map the button inputs 1015 including buttons 1016, 1017, 1018, 1019 to movements 916, 917, 918, 919 (see FIG. 9) of the first machine 115. The command module 325 may also map the button inputs 1025 including buttons 1026, 1027 to the accessory controls 925. In an exemplary example, the first operator 106 may press the button 1018 on the peripheral input device 140 and simultaneously press the button 1006. The command module 325 may map the buttons 1018 and 1006 pressed to the leftward movement 918 (see FIG. 9) and the vertical movement 906 (see FIG. 9) of the first machine implement 801. The command module 325 may then record the buttons 1018 and 1006 pressed as input commands corresponding to the leftward movement 918 (see FIG. 9) and the vertical movement 906 (see FIG. 9) of the first machine implement 801.

Referring again to FIG. 3, the haptic feedback module 326 may provide the haptic feedback such as, for example, the vibration of the first mobile device 105 in response to the input commands recorded or registered by the command module 325 corresponding to the controls 906-909, 916-919, 921-922, 925 and/or the combination of the controls 906-909, 916-919, 921-922, 925.

The command module 325 may then transmit the input commands to the first machine 115 via the communication interface 245 (see FIG. 3) of the first mobile device 105. The input commands may correspond to computer instructions that enable the first machine 115 to perform one or more functions corresponding to the controls 906-909, 916-919, 921-922, 925 and/or the combination of the controls 906-909, 916-919, 921-922, 925 selected by the first operator 106.

Referring to FIGS. 9-10, the machine control module 315 of FIG. 3 may then track changes in the machine parameters 500 corresponding to the input commands being executed by the first machine 115. In one embodiment, the change in the machine parameters 500 may be retrieved by machine control module 315 after the input commands are transmitted from the first mobile device 105. In another embodiment, the machine control module 315 may receive the changes transmitted from the first machine 115 directly via the communication interface 245. The machine parameters 500 tracked may include, but is not limited to, the first machine implement position 805, the machine speed displayed as 511, and the engine rpm displayed as 512. The machine control module 315 may display the changes in the first machine implement position 805 in real-time as text, icons, symbols, images, animations, and/or live video on the GUI 401 of the standalone application. The machine control module 315 may also display the changes in the machine speed and the engine rpm as text 511, 512. The text 511, 512 displayed may be updated constantly by the machine control module 315 to indicate the changes retrieved or received from the first machine 115 in real-time. In some embodiments, the machine control module 315 may also track and display additional machine related information including a speed and a rate of performing the functions by the first machine 115 corresponding to the input commands. The machine control module 315 may retrieve or receive the additional machine related information from the first machine 115 in real-time. For instances when the first mobile device 105 may be connected to or paired with the peripheral input device 140, as shown in FIG. 10, the command module 325 may also track and display changes in the machine parameters 500 corresponding to the fuel level, the urea level, the hydraulic oil temperature, and the engine coolant temperature as text, icons, symbols, images, and/or animations on the GUI 401 of the standalone application in the first mobile device 105. For example, the machine control module 315 may display the changes received or retrieved corresponding to the fuel level, the urea level, the hydraulic oil temperature, and the engine coolant temperature as animations 1030, 1035, 1040, 1045 respectively.

Referring again to FIG. 3, the processor 210 may also include a safety module 330 configured to disable one or more of the controls 906-909, 916-919, 921-922, 925 (as shown in FIG. 9) on the GUI 401 of the standalone application based on the Boolean state of the machine parameters 500 (see FIG. 9) in the first machine 115. The Boolean state of the machine parameters 500 may be retrieved from the first machine 115 and continuously tracked by the machine control module 315 in real-time. For example, the safety module 330 may disable the controls 906-909, 916-919, 921-922, 925 when the machine control module 315 may detect a change in the Boolean state of the parking brake of the first machine 115 corresponding to an application of the parking brake in the first machine 115. The machine control module 315 may then display the parking brake icon 505 (see FIGS. 5-6) of the machine parameters 500 in a red color indicating that the parking brake of the first machine 115 may be active. Similarly, the safety module 330 may disable one or more of the controls 906-909, 916-919, 921-922, 925 for instances when the machine control module 315 displays the cab door icon 510 (see FIGS. 5-6) in a yellow color indicating that the cab door of the first machine 115 may be open.

The safety module 330 may also be configured to relay a deactivation command to the first machine 115 to stop the execution of the input commands by the first machine 115 when the first mobile device 105 is idle and/or inoperable. The safety module 330 may be configured detect a temporary suspension of the standalone application in the first mobile device 105 due to interruptions such as, for example, the first mobile device 105 receiving an incoming call. The safety module 330 may also be configured to detect a closing of the standalone application in the first mobile device 105 as a result of the first operator 106 suspending or closing the standalone application voluntarily to make a call. In addition, the safety module 330 may also be configured to detect an accidental droppage of the first mobile device 105. The safety module 330 may be in communication with the sensors 250 (see FIG. 2), such as magnetic or gyroscopic sensors to detect the droppage of the first mobile device 105. The safety module 330 may subsequently relay the deactivation command to the first machine 115 corresponding to the temporary suspension, closing, and/or droppage of the first mobile device 105.

The safety module 330 may also be configured to relay a shut-down command to the first machine 115 to switch off an engine (not shown) of the first machine 115. In one embodiment, the safety module 330 may relay the shut-down command when the first machine 115 is detected to be at a predefined proximity from the first mobile device 105. The machine control module 315 may retrieve and set the predefined proximity information from the first machine 115 via the communication interface 245. The safety module 330 may access the predefined proximity information set by the machine control module 315 prior to relaying the shut-down command. The safety module 330 may also be in communication via the communication interface 245 with a proximity detection system 930 (see FIG. 9) that is paired with the first mobile device 105 in order to detect the proximity of the first machine 115 with the first mobile device 105. An example of the proximity detection system 930 may include, but is not limited to, a radio-frequency identification (RFID) reader connected to or paired with the first mobile device 105 that reads an RFID tag affixed to the first machine 115.

In another embodiment, the safety module 330 may be configured to receive the shut-down command from the first operator 106 via the peripheral input device 140 for instances when the first mobile device 105 may be connected to or paired with the peripheral input device 140 as the input device 235 (see FIG. 2) of the first mobile device 105. The peripheral input device 140 may include a peripheral safety module 340 that may facilitate the first operator 106 to provide the shut-down command to the first mobile device 105 via the peripheral input device 140 when the first mobile device 105 may be inoperable. For example, the GUI 401 (see FIG. 4) of the stand-alone application in first mobile device 105 may be temporarily unresponsive and the first operator 106 may send the shut-down command via a button input or a touch screen input provided in the peripheral input device 140. The peripheral safety module 340 may record the button input or the touch screen input and send the shut-down command to the safety module 330. The safety module 330 may, in turn, relay the shut-down command received from the peripheral input device 140 to the first machine 115 to switch off the engine (not shown) of the first machine 115.

In some embodiments, the peripheral safety module 340 may also track and/or relay a predefined safety sequence to the safety module 330. In an embodiment, the predefined safety sequence may correspond to a heartbeat sequence of the first operator 106. For example, the peripheral safety module 340 may also track the heartbeat sequence of the first operator 106 via the peripheral input device 140 such as, for example, the smart watch worn by the first operator 106. The peripheral input device 140 may include a heartbeat sensor (not shown) that may detect the heartbeat sequence of the first operator 106 and the peripheral safety module 340 may receive the heartbeat sequence detected by the heartbeat sensor. The peripheral safety module 340 may correspond to hardware and/or software components provided in the peripheral input device 140. In one embodiment, the safety module 330 may monitor the predefined safety sequence received from the peripheral safety module 340 and relay the shutdown command to the first machine 115 for instances when safety module 330 determines that the predefined safety sequence may be irregular or non-uniform. In another embodiment, the safety module 330 may relay the predefined safety sequence received from the peripheral safety module 340 directly to the first machine 115 for instances when the first mobile device 105 may be inoperable or when the GUI 401 (see FIG. 4) may be unresponsive. The first machine 115 may then turn off an engine (not shown) of the first machine upon determining that the predefined safety sequence received from the first mobile device 105 may be irregular or non-uniform.

The different functions of the modules 315-330 of the processor 210 described with respect to the first machine 115 may also be applicable to the second machine 120, the third machine 125, and/or the fourth machine 130 and briefly disclosed in FIGS. 11-16. Accordingly, detailed descriptions of the different functions of the modules 315-330 of the processor 210 corresponding to the second machine 120, the third machine 125, and/or the fourth machine 130 are omitted for brevity.

In an exemplary illustration, as shown in FIG. 4, the first operator 106 may select the second machine 120 from the machines 400 displayed on the GUI 401 and establish the wireless connection with between the second machine 120 and the first mobile device 105. The second machine 120 may correspond to the Small Wheel Loader (SWL).

Figure 11:
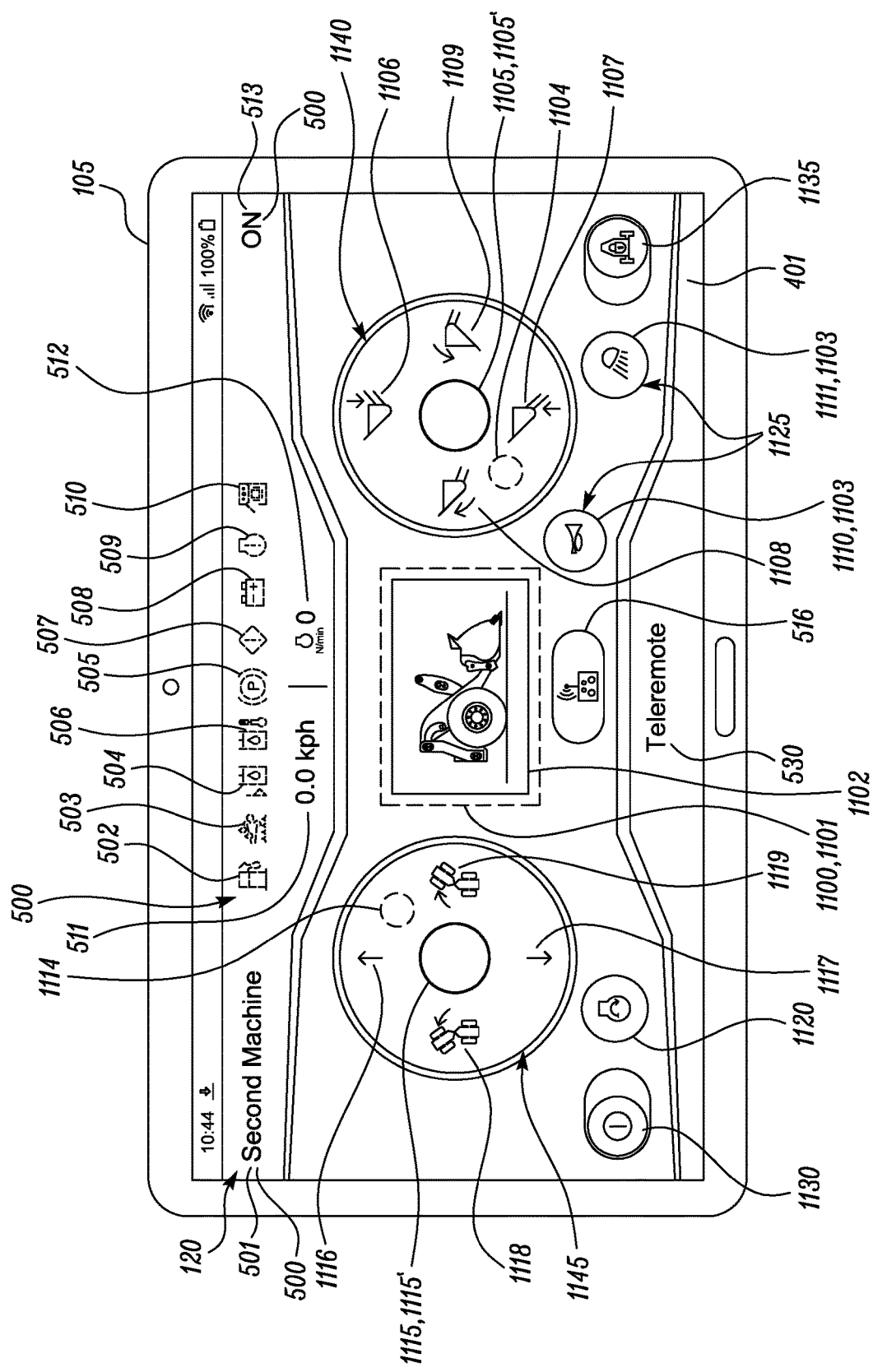
FIG. 11 is an exemplary illustration of controls associated with a second machine of FIG. 4 being retrieved from the second machine and displayed on the mobile device of FIG. 2, in accordance with the embodiment of the present disclosure.

Referring to FIG. 11, the implement module 320 of FIG. 3 may record a selection of a second machine implement 1101 from implements 1100 of the second machine 120 by the first operator 106 (see FIG. 1) and display the second machine implement 1101 on the GUI 401. The implement module 320 may also retrieve and display controls 1106-1109, 1116-1119, 1120, 1125, 1130, 1135 corresponding to the second machine 120, the second machine implement 1101, and accessories 1103 of the second machine 120. The implement module 320 may also retrieve and display a spatial position 1102 of the second machine implement 1101 on the GUI 401 as text, icons, symbols, images, animations, video, and/or live video. The connection indicator 530 may display the "Teleremote" mode of the wireless connection and thereby, indicating to the first operator 106 that the second machine implement 1101 is under the remote-control of the first mobile device 105 and may be wirelessly controlled by the first mobile device 105. The controls 1106-1109, 1116-1119, 1120, 1125, 1130, 1135 may include implement manoeuvres 1106-1109 that may correspond to vertical movements 1106, 1107 and horizontal or angular movements 1108, 1109 of the second machine implement 1101. The controls 1106-1109, 1116-1119, 1120, 1125, 1130, 1135 may also include machine manoeuvres 1116-1119 that may correspond to linear movements 1116, 1117 and sideways movements 1118, 1119 of the second machine 120. Further, the controls 1106-1109, 1116-1119, 1120, 1125, 1130, 1135 may include an engine control 1120 that may correspond to an engine start/stop control of the second machine 120. In addition, the controls 1106-1109, 1116-1119, 1120, 1125, 1130, 1135 may include accessory controls 1125 of the accessories 1103, for example, activating or de-activating a horn via icon 1110 and/or switching on or off lights via icon 1111 of the second machine 120. Further, the controls 1106-1109, 1116-1119, 1120, 1125, 1130, 1135 may include additional machine controls such as, for example, machine key on/off control 1130 and machine lock on/off control 1135. In an embodiment, the command module 325 (see FIG. 3) may also provide command joysticks 1105, 1115 at predefined default positions, for example, 1105', 1115' respectively within control areas 1140, 1145. The command joysticks 1105, 1115 may be moved, displaced, and/or positioned at different control locations such as, for example, 1104, 1114 within the control areas 1140, 1145 respectively. Further, the command module 325 may ascertain and assign a percentage of power to be applied by the second machine 120 corresponding to the controls 1106-1109, 1116-1119 displayed based on the position of the command joysticks 1105, 1115.

Figure 12:
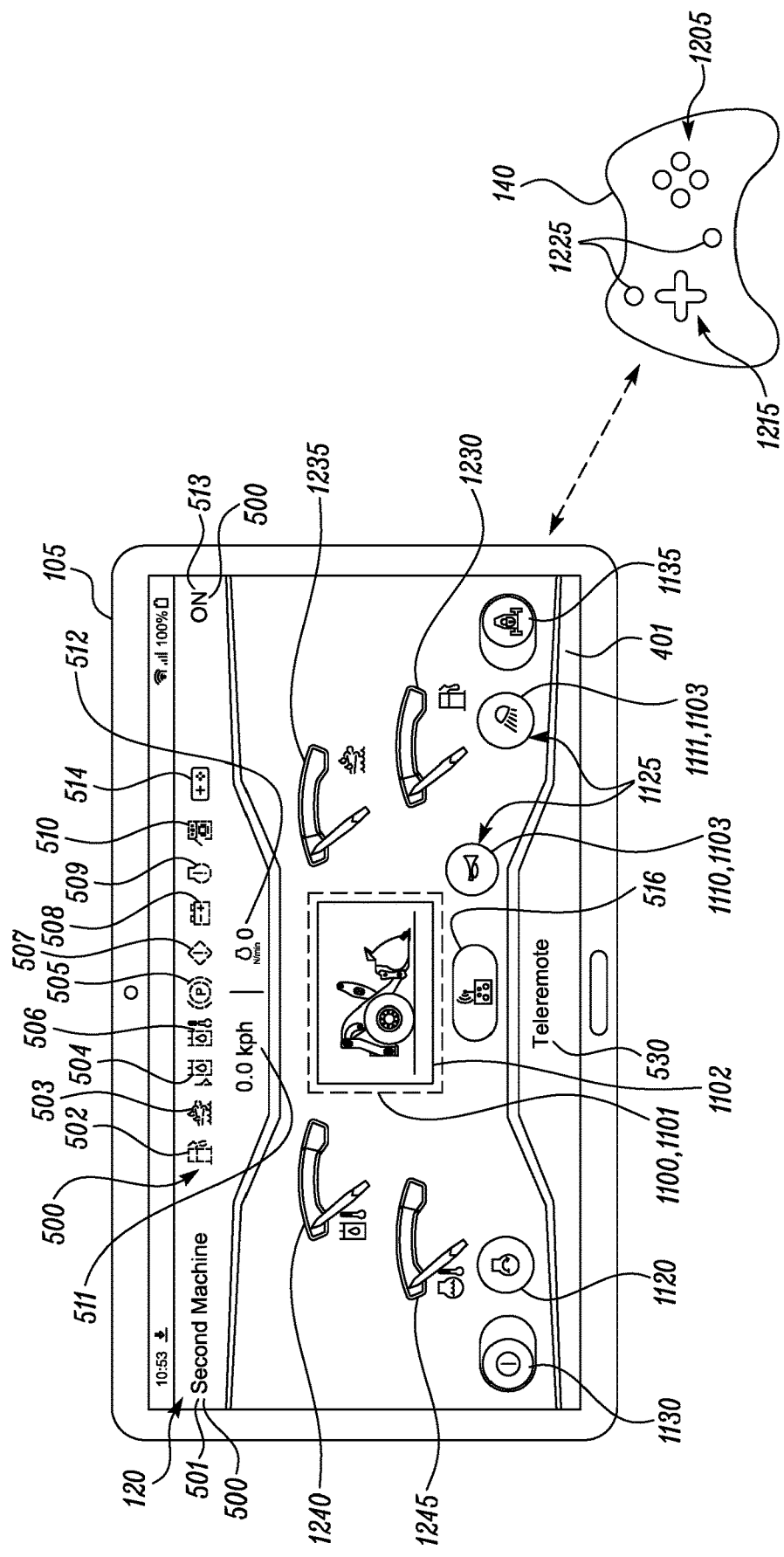
FIG. 12 is an exemplary illustration of the mobile device of FIG. 2 being paired with the peripheral input device of FIG. 7 and the controls of FIG. 11 mapped with controls provided in the peripheral input device, in accordance with the embodiment of the present disclosure.

For instances when the first mobile device 105 may be connected to or paired with the peripheral input device 140, as shown in FIG. 12, the first operator 106 may register one or more button inputs from a group of button inputs 1205, 1215, 1225 corresponding to the controls 1106-1109, 1116-1119, 1120, 1125 respectively. The command module 325 of FIG. 3 may map and record the button inputs registered from the group of button inputs 1205, 1215, 1225 as the input commands corresponding to the controls 1106-1109, 1116-1119, 1120, 1125 respectively. Upon execution of the input commands by the second machine 120, the machine control module 315 of FIG. 3 may track and display the changes received or retrieved from the second machine 120 corresponding to fuel level, the urea level, the hydraulic oil temperature, and the engine coolant temperature as animations 1230, 1235, 1240, 1245 respectively.

Figure 13:
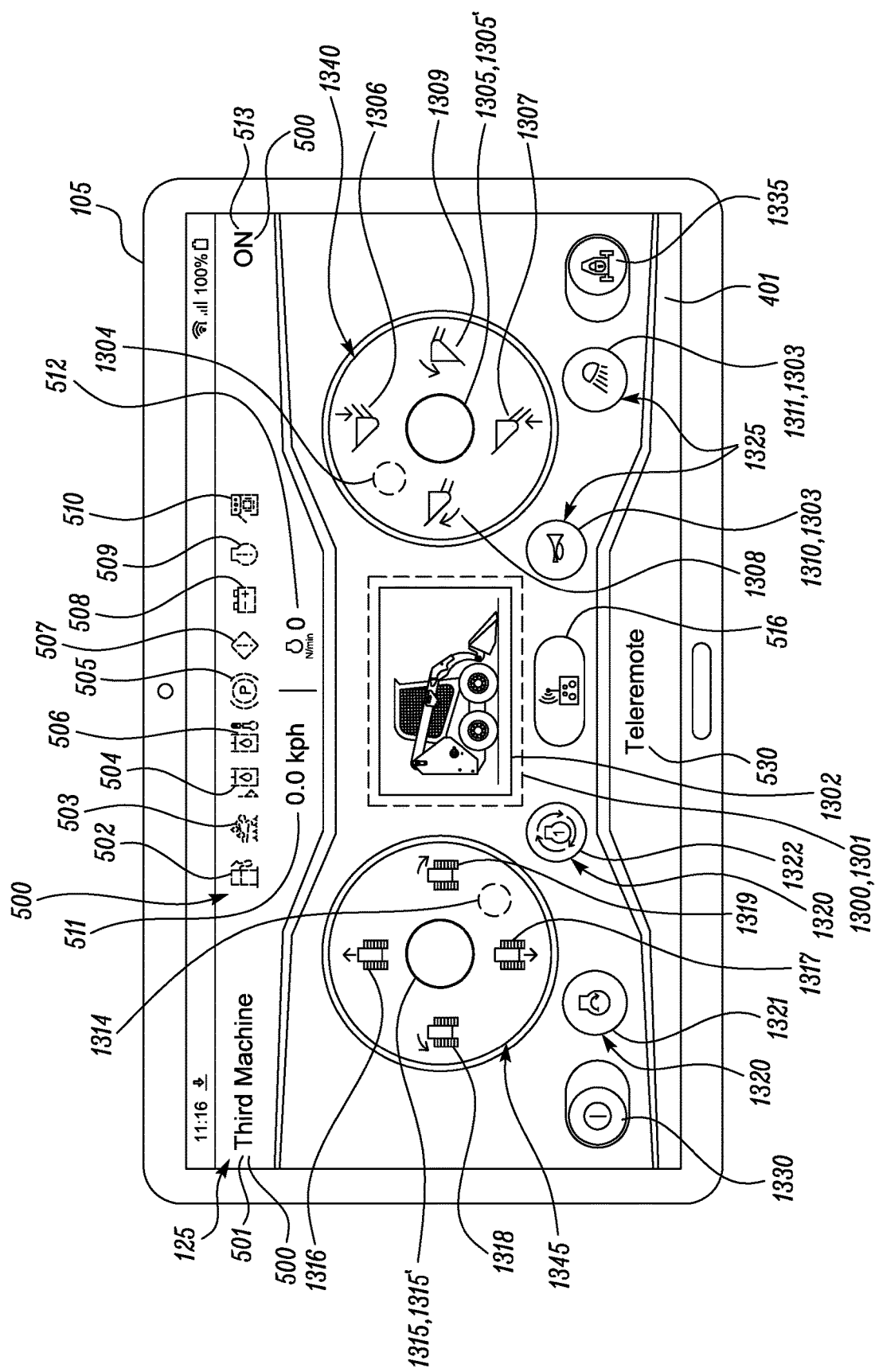
FIG. 13 is an exemplary illustration of controls associated with a third machine of FIG. 4 being retrieved from the third machine and displayed on the mobile device of FIG. 2, in accordance with the embodiment of the present disclosure.

Referring to FIG. 13, the implement module 320 of FIG. 3 may record a selection of a third machine implement 1301 from implements 1300 of the third machine 125 by the first operator 106 (see FIG. 1) and display the third machine implement 1301 on the GUI 401. The third machine 125 may correspond to the Skid Steer Loaders (SSL) loader. The implement module 320 may also retrieve and display controls 1306-1309, 1316-1319, 1321-1322, 1325, 1330, 1335 corresponding to the third machine 125, the third machine implement 1301, and accessories 1303 of the third machine 125. The implement module 320 may also retrieve and display a spatial position 1302 of the third machine implement 1301 on the GUI 401 as text, icons, symbols, images, animations, video, and/or live video. The connection indicator 530 may display the "Teleremote" mode of the wireless connection and thereby, indicating to the first operator 106 that the third machine implement 1301 is under the remote-control of the first mobile device 105 and may be wirelessly controlled by the first mobile device 105. The controls 1306-1309, 1316-1319, 1321-1322, 1325, 1330, 1335 may include implement manoeuvres 1306-1309 that may correspond to vertical movements 1306, 1307 and horizontal or angular movements 1308, 1309 of the third machine implement 1301. The controls 1306-1309, 1316-1319, 1321-1322, 1325, 1330, 1335 may also include machine manoeuvres 1316-1319 that may correspond to linear movements 1316, 1317 and sideways movements 1318, 1319 of the third machine 125. Further, the controls 1306-1309, 1316-1319, 1321-1322, 1325, 1330, 1335 may include an engine controls 1321-1322 that may correspond to an engine start/stop control 1321 and an engine speed setting control 1322 of the third machine 125. In addition, the controls 1306-1309, 1316-1319, 1321-1322, 1325, 1330, 1335 may include accessory controls 1325 of the accessories 1303 that may correspond to activating or de-activating a horn via icon 1310 and/or switching on or off lights of the third machine 125 via icon 1311. Further, the controls 1306-1309, 1316-1319, 1321-1322, 1325, 1330, 1335 may include additional machine controls such as, for example, machine key on/off control 1330 and machine lock on/off control 1335. In an embodiment, the command module 325 (see FIG. 3) may also provide command joysticks 1305, 1315 at predefined default positions, for example, 1305', 1315' respectively within control areas 1340, 1345. The command joysticks 1305, 1315 may be moved, displaced, and/or positioned at different control locations such as, for example, 1304, 1314 within the control areas 1340, 1345 respectively. Further, the command module 325 may ascertain and assign a percentage of power to be applied by the third machine 125 corresponding to the controls 1306-1309, 1316-1319 displayed based on the position of the command joysticks 1305, 1315.

Figure 14:
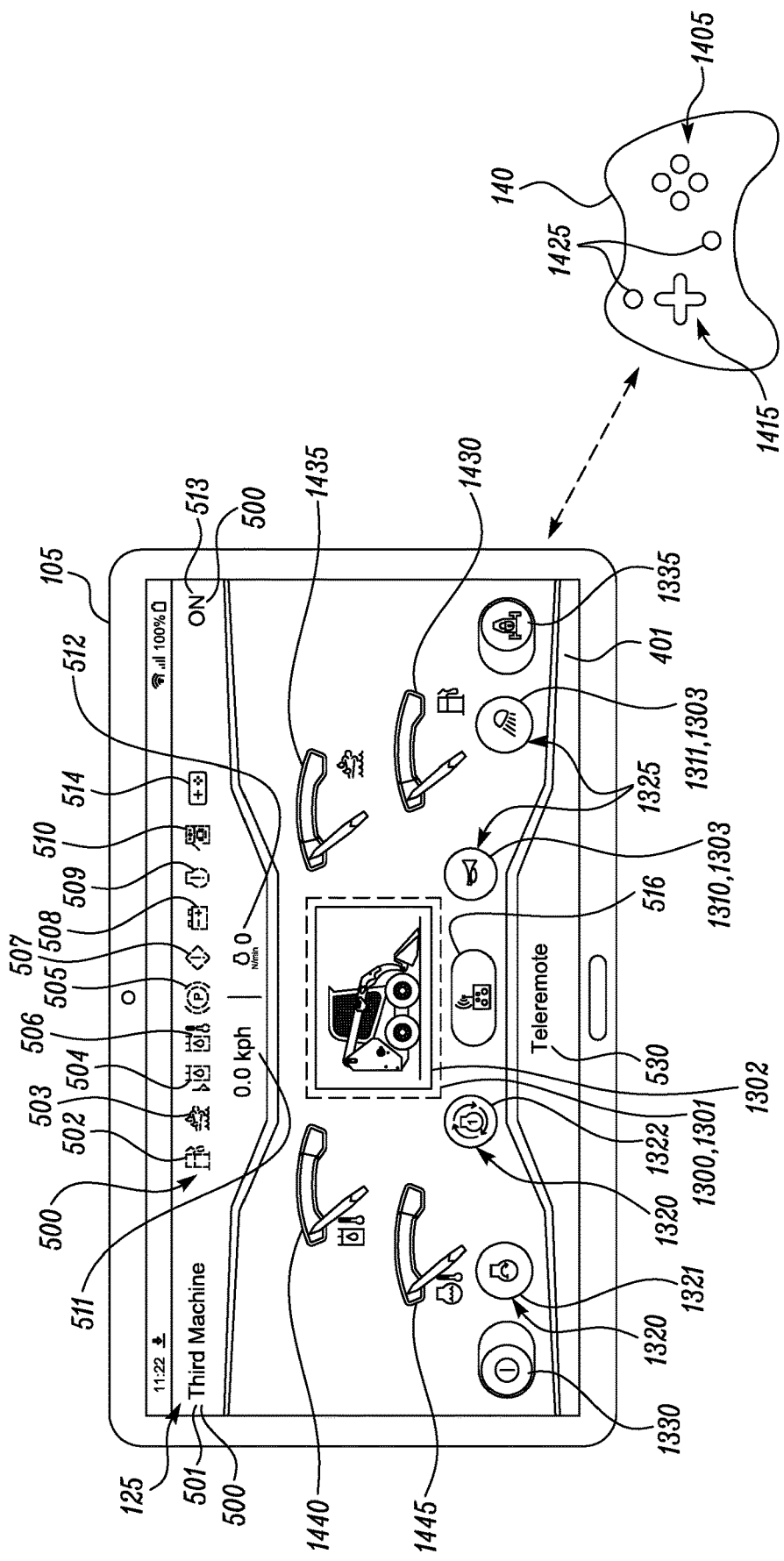
FIG. 14 is an exemplary illustration of the mobile device of FIG. 2 being paired with the peripheral input device of FIG. 7 and the controls of FIG. 13 mapped with controls provided in the peripheral input device, in accordance with the embodiment of the present disclosure.

For instances when the first mobile device 105 may be connected to or paired with the peripheral input device 140, as shown in FIG. 14, the first operator 106 (see FIG. 1) may register one or more button inputs from a group of button inputs 1405, 1415, 1425 respectively corresponding to the controls 1306-1309, 1316-1319, 1321-1322, 1325 respectively. The command module 325 of FIG. 3 may map and record the button inputs registered from group of button inputs 1405, 1415, 1425 respectively as the input commands corresponding to the controls 1316-1319, 1321-1322, 1325 respectively. Upon execution of the input commands by the third machine 125, the machine control module 315 of FIG. 3 may track and display the changes received or retrieved from the third machine 125 corresponding to fuel level, the urea level, the hydraulic oil temperature, and the engine coolant temperature as animations 1430, 1435, 1440, 1445 respectively.

Figure 15:
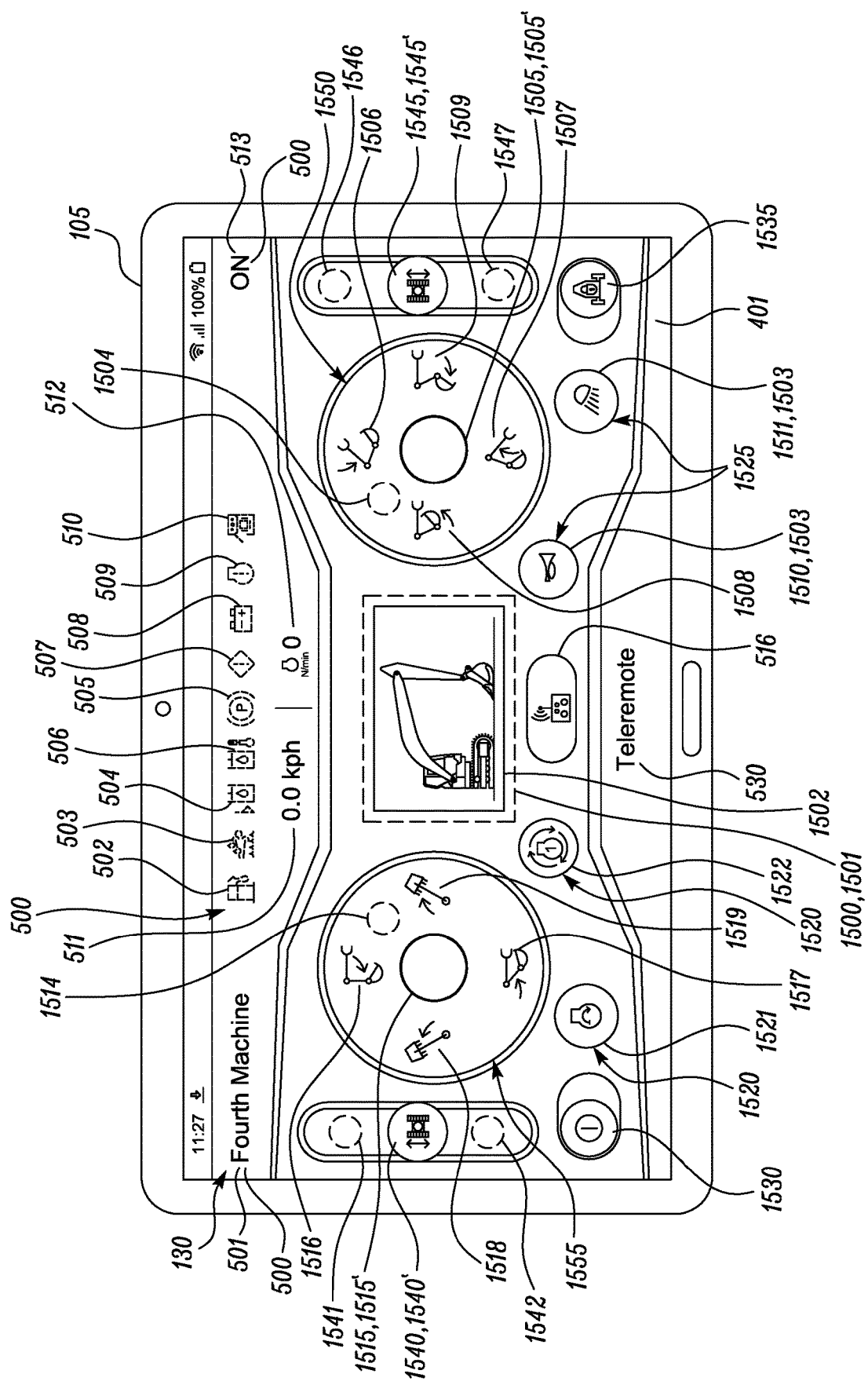
FIG. 15 is an exemplary illustration of controls associated with a fourth machine of FIG. 4 being retrieved from the fourth machine and displayed on the mobile device of FIG. 2, in accordance with the embodiment of the present disclosure.

Referring to FIG. 15, the implement module 320 of FIG. 3 may record a selection of a fourth machine implement 1501 from implements 1500 of the fourth machine 130 by the first operator 106 (see FIG. 1) and display the fourth machine implement 1501 on the GUI 401. The fourth machine 130 may correspond to the Hydraulic Excavator (HEX). The implement module 320 may also retrieve and display controls 1506-1509, 1516-1519, 1521-1522, 1525, 1530-1545 corresponding to the fourth machine 130, the fourth machine implement 1501, and accessories 1503 of the fourth machine 130. The implement module 320 may also retrieve and display a spatial position 1502 of the fourth machine implement 1501 on the GUI 401 as text, icons, symbols, images, animations, video, and/or live video. The connection indicator 530 may display the "Teleremote" mode of the wireless connection and thereby, indicating to the first operator 106 that the fourth machine implement 1501 is under the remote-control of the first mobile device 105 and may be wirelessly controlled by the first mobile device 105. The controls 1506-1509, 1516-1519, 1521-1522, 1525, 1530-1545 may include implement manoeuvres 1506-1509 that may correspond to vertical movements 1506, 1507 and horizontal or angular movements 1508, 1509 of the fourth machine implement 1501. The controls 1506-1509, 1516-1519, 1521-1522, 1525, 1530-1545 may also include additional implement manoeuvres 1516-1519 that may correspond to linear movements 1516, 1517 and angular movements 1518, 1519 of the fourth machine implement 1501. Further, the controls 1506-1509, 1516-1519, 1521-1522, 1525, 1530-1545 may include an engine controls 1521-1522 that may correspond to an engine start/stop control 1521 and an engine speed setting control 1522 of the fourth machine 130. In addition, the controls 1506-1509, 1516-1519, 1521-1522, 1525, 1530-1545 may include accessory controls 1525 of the accessories 1503 that may correspond to activating or de-activating a horn via icon 1510 and/or switching on or off lights via icon 1511 of the fourth machine 130. Further, the controls 1506-1509, 1516-1519, 1521-1522, 1525, 1530-1545 may include additional machine controls such as, for example, machine key on/off control 1530 and machine lock on/off control 1535. The controls 1506-1509, 1516-1519, 1521-1522, 1525, 1530-1545 may also include additional machine manoeuvre controls such as, for example, a leftward pedal acceleration/deceleration control 1540 and a right pedal acceleration/deceleration control 1545 of the fourth machine 130. In an embodiment, positions of the controls 1540, 1545 may be displaced from respective predefined default positions 1540', 1545' to control positions 1541, 1546 or control positions 1542, 1547 respectively. The command module 325 (see FIG. 3) may also revert the positions of controls 1540, 1545 back to the predefined default positions 1540', 1545' respectively upon withdrawal of input or touch from the GUI 401 by the first operator (see FIG. 1) from the control positions 1541, 1546 or the control positions 1542, 1547. In an embodiment, the command module 325 (see FIG. 3) may also provide command joysticks 1505, 1515 at predefined default positions, for example, 1505', 1515' respectively within control areas 1550, 1555. The command joysticks 1505, 1515 may be moved, displaced, and/or positioned at different control locations such as, for example, 1504, 1514 within the control areas 1550, 1555 respectively. Further, the command module 325 may ascertain and assign a percentage of power to be applied by the fourth machine 130 corresponding to the controls 1506-1509, 1516-1519 displayed based on the position of the command joysticks 1505, 1515. The command module 325 may also ascertain and assign a percentage of power to be applied by the fourth machine 130 corresponding to the controls 1540, 1545 displayed based on the position of controls 1540, 1545. For example, when the controls 1540, 1545 are positioned at the control positions 1541 and 1546 respectively, the command module 325 may ascertain and assign 80 percent power to be applied corresponding to a forward movement of the fourth machine 130.

Figure 16:
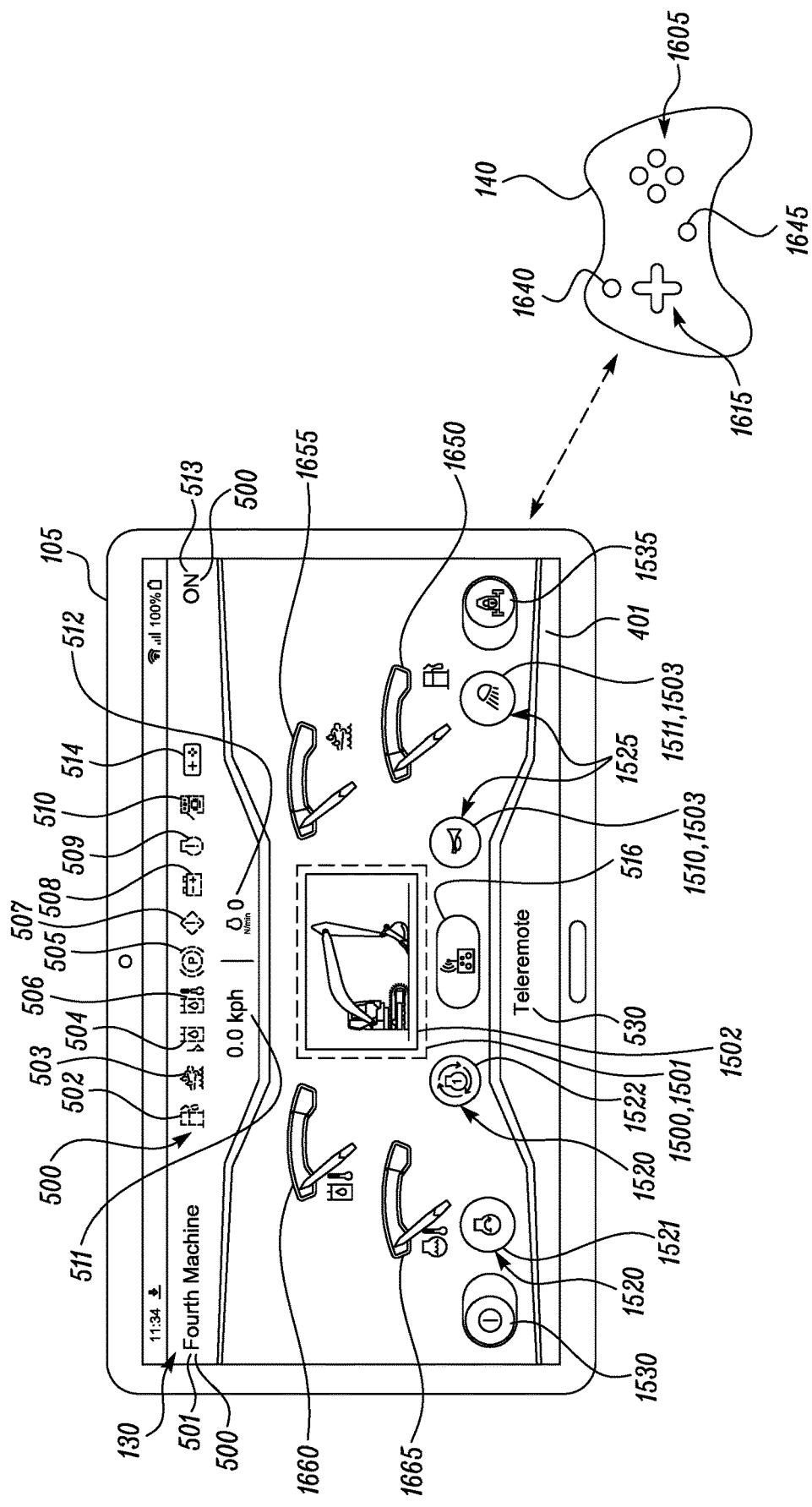
FIG. 16 is an exemplary illustration of the mobile device of FIG. 2 being paired with the peripheral input device of FIG. 7 and the controls of FIG. 15 mapped with controls provided in the peripheral input device, in accordance with the embodiment of the present disclosure.

For instances when the first mobile device 105 may be connected to or paired with the peripheral input device 140, as shown in FIG. 16, the first operator 106 may register one or more button inputs from a group of button inputs 1605, 1615, 1640, 1645 respectively corresponding to the controls 1506-1509, 1516-1519, 1540, 1545 respectively. The command module 325 of FIG. 3 may map and record the button inputs registered from the group of button inputs 1605, 1615, 1640, 1645 as the input commands corresponding to the controls 1506-1509, 1516-1519, 1540, 1545 respectively. Upon execution of the input commands by the fourth machine 130, the machine control module 315 of FIG. 3 may track and display the changes received or retrieved from the fourth machine 130 corresponding to fuel level, the urea level, the hydraulic oil temperature, and the engine coolant temperature as animations 1650, 1655, 1660, 1665 respectively.

Figure 17:
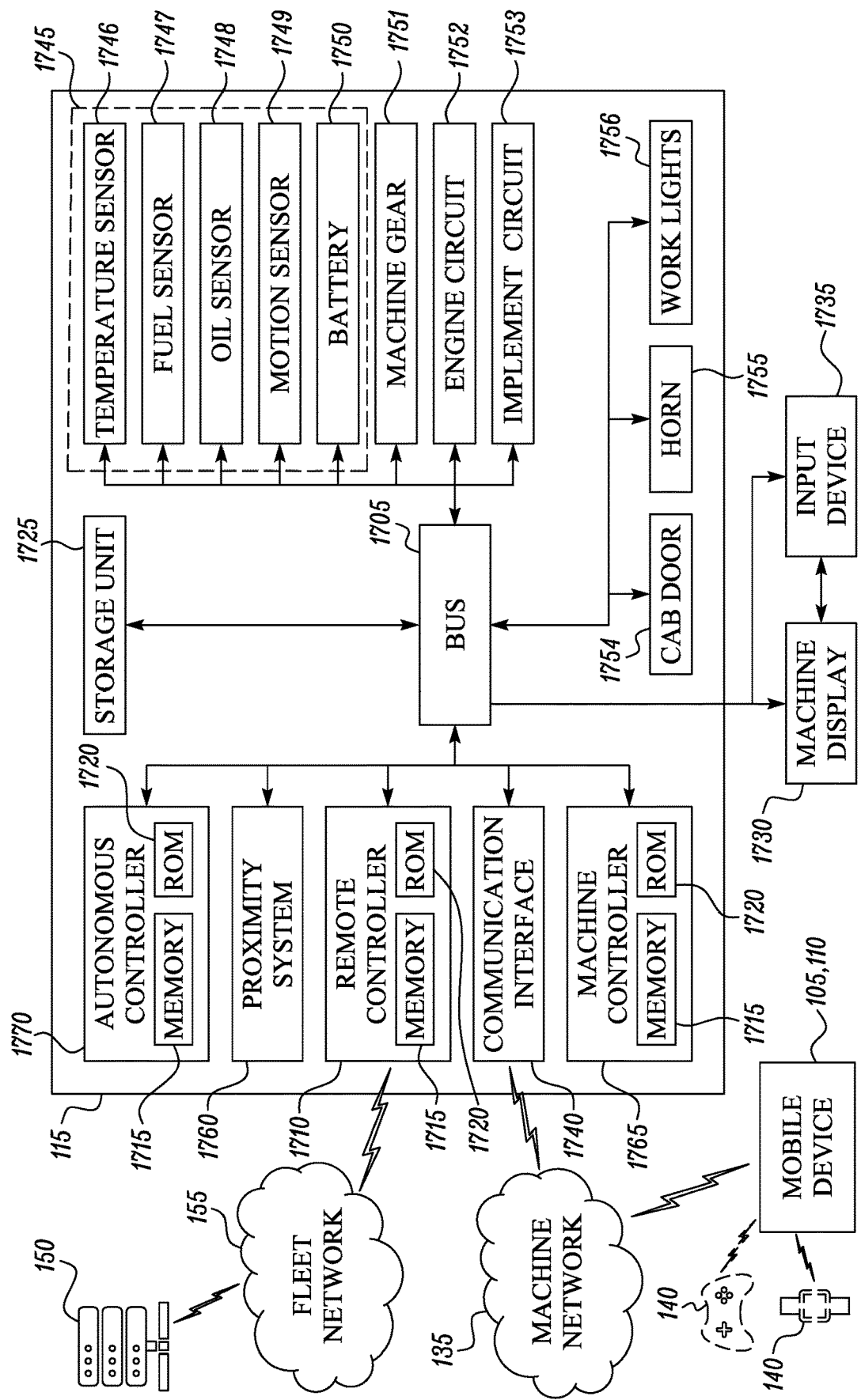
FIG. 17 is a schematic block diagram of a machine configured for wireless communication with the mobile device of FIG. 2 in order to perform remote operations, in accordance with the embodiment of the present disclosure.

Referring to FIG. 17, a schematic block diagram of the first machine 115 of FIG. 1 is disclosed. The first machine 115 may also correspond to the machines 400 including the second machine 120, the third machine 125, and the fourth machine 130 as shown in FIG. 4. The first machine 115 includes a bus 1705 or other communication mechanism for communicating information, and a remote controller 1710 coupled with the bus 1705 for processing information. The remote controller 1710 may also be referred to as a Remote Electronic Control Module (RECM). The remote controller 1710 may include a memory 1715, such as a random-access memory (RAM) or other dynamic storage device, coupled to the bus 1705 for storing information and instructions to be executed by the remote controller 1710. The memory 1715 can be used for storing temporary variables or other intermediate information during execution of instructions to be executed by the remote controller 1710. In some embodiments, the memory 175 may also store a Personal-Identification-Number (PIN) or a pre-set password necessary to establish a wireless connection with one or more mobile devices, for example, the mobile devices 105, 110 (see FIG. 1). The memory 1715 may also be used to temporarily store one or more input commands received wirelessly from the mobile devices 105, 110 respectively. The remote controller 1710 may also include a read only memory (ROM) 1720 or other static storage device coupled to bus 1705 for storing static information and instructions for the remote controller 1710. A storage unit 1725, such as a magnetic disk or optical disk, is provided and coupled to the bus 1705. The storage unit 1725 may store machine related information corresponding to the first machine 115. The machine related information may include implements such as, for example, the implements 800 (see FIG. 8), of the first machine 115. The machine related information may also include accessories such as, for example, the accessories 815 (see FIG. 8), of the first machine 115. Further, machine related information may also include controls such as, for example, the controls 906-909, 916-919, 921-922, 925 (see FIG. 9) of the first machine 115, the implements 800 of the first machine 115, and the accessories 815 of the first machine 115 respectively. The machine related information may also include predefined proximity information that defines a minimum proximity distance to initiate one or more actions such as shut down of the first machine 115 or temporary suspension of operation of the first machine 115. The machine related information may be stored in the storage unit 1725 and/or temporarily accessed by the remote controller 1710 via the memory 215. In an embodiment, the machine related information may be stored in one or more data formats such as, for example, a Hypertext Markup language (HTML) format in the storage unit 1725. The machine related information may also include text, icons, symbols, images, animations, video, and/or live video stream corresponding to the first machine, the machine parameters, the implements, the accessories, and the controls respectively.

The first machine 115 can be coupled via the bus 1705 to a display 1730, such as a cathode ray tube (CRT), and liquid crystal display (LCD) for displaying information to an operator such as, for example, the first operator 106 (see FIG. 1). An input device 1735 is coupled to bus 1705 for communicating information and command selections to the remote controller 1710. Examples of the input device 1735 include, but are not limited to, a mouse, a trackball, cursor direction keys, or a touch screen.

Various embodiments are related to the use of the first machine 115 for implementing the techniques described herein. In one embodiment, the techniques are performed by the first machine 115 in response to the remote controller 1710 executing instructions included in the memory 715. Such instructions can be read into the memory 1715 from another machine-readable medium, such as the storage unit 1725. Execution of the instructions included in the memory 1715 causes the remote controller 1710 to perform the process steps described herein. The bus 1705 carries the data to the memory 1715, from which the remote controller 1710 retrieves and executes the instructions. The instructions received by the memory 1715 can optionally be stored on storage unit 1725 either before or after execution by the remote controller 1710.

The first machine 115 also includes a communication interface 1740 coupled to the bus 1705. The communication interface 1740 provides a two-way data communication coupling with a mobile device such as, for example, the first mobile device 105 (see FIG. 1) via the machine network 135 created by the first machine 115. For example, the communication interface 1740 can be an integrated service digital network (ISDN) card or a modem to provide a data communication connection to a corresponding type of telephone line. As another example, the communication interface 1740 can be a local area network (LAN) card to provide a data communication connection to a compatible LAN. Wireless links can also be implemented. In any such implementation, the communication interface 1740 sends and receives radio, electrical, electromagnetic, or optical signals that carry digital data streams representing various types of information. Examples of the communication interface 1740 include, but are not limited to, a Wi-Fi access point for creating the machine network 135 (also shown FIG. 1) and/or a Wi-Fi radio to establish connection with the fleet network 155 (also shown in in FIG. 1).

The first machine 115 may also include one or more sensors 1745 coupled to the bus 205. The sensors 250 enable detection of one or more machine parameters, such as the machine parameters 500 (see FIG. 5), of the first machine 115 such as, for example, oil temperature, coolant temperature, fuel level, oil level, machine movement, and battery percentage. Examples of the sensors 1745 include, but are not limited to, a temperature sensor 1746, a fuel level sensor 1747, an oil level sensor 1748, a motion sensor 1749, a battery level or voltage sensor 1750.

The first machine 115 may also include an electronic circuitry including a machine gear circuit 1751 to detect machine gear in position and to control the machine gear of the first machine 115. Further, the first machine 115 may include an electronic circuitry including an engine circuit 1752 to detect engine speed and to control engine on/off of the first machine 115. The first machine 115 may also include the electronic circuitry including an implement circuit 1753 to control movements of the implements, for example, the implements 800 (see FIG. 8), of the first machine 115 and track spatial positions of the implements 800 respectively. The first machine 115 may also include the electronic circuitry corresponding to a cab door 1754 to detect opening or closing of the cab door 1754. The first machine 115 may also include the electronic circuitry corresponding to a horn 1755 to control activation or deactivation of the horn 1755. The first machine 115 may also include the electronic circuitry corresponding to lights 1756 to control switching on/off of the lights 1756. The first machine 115 may also include additional electronic circuitry corresponding to one or more parts or functions of the first machine 115 such as, for example, but not limited to, machine steering system, machine braking system, and machine power-window system.

The first machine 115 may also include a proximity system 1760 to enable proximity detection of mobile devices such as, for example, the mobile devices 105, 110 (see FIG. 1) by the first machine 115. Examples of the proximity system 1760 may include, but not limited to, an RFID reader and/or a RFID tag. The proximity system 1760 may also enable the first machine 115 to detect proximity with other machines such as, for example, the second machine 120, the third machine 125, and/or the fourth machine 130 as shown in FIG. 1.

The first machine 115 may also include a machine controller 1765 coupled to the bus 1705 to monitor and control machine components and processes. The machine controller 1765 may also be referred to as a Machine Electronic Control Module (MECM). The first machine 115 may also include an autonomous controller 1770 coupled to the bus 1705 to enable the first machine 115 to establish a wireless connection with the fleet network 155 (also shown in FIG. 1) via the communication interface 1740. The autonomous controller 1770 may also be referred to as an Autonomous Electronic Control Module (AECM). The autonomous controller 1770 may also enable the first machine 115 to move autonomously via assistance from the server 150 (also shown in in FIG. 1) connected to the fleet network 155. The machine controller 1765 and the autonomous controller 1770 may also include the memory 1715 and the ROM 1720 respectively.

In some embodiments, the remote controller 1710 of the first machine 115 may be capable of executing the one or more predefined computer instructions in order to perform one or more functions. The remote controller 1710 may also include one or more computer modules 1805-1820 (as shown in FIG. 18) to perform the one or more functions.

Figure 18:
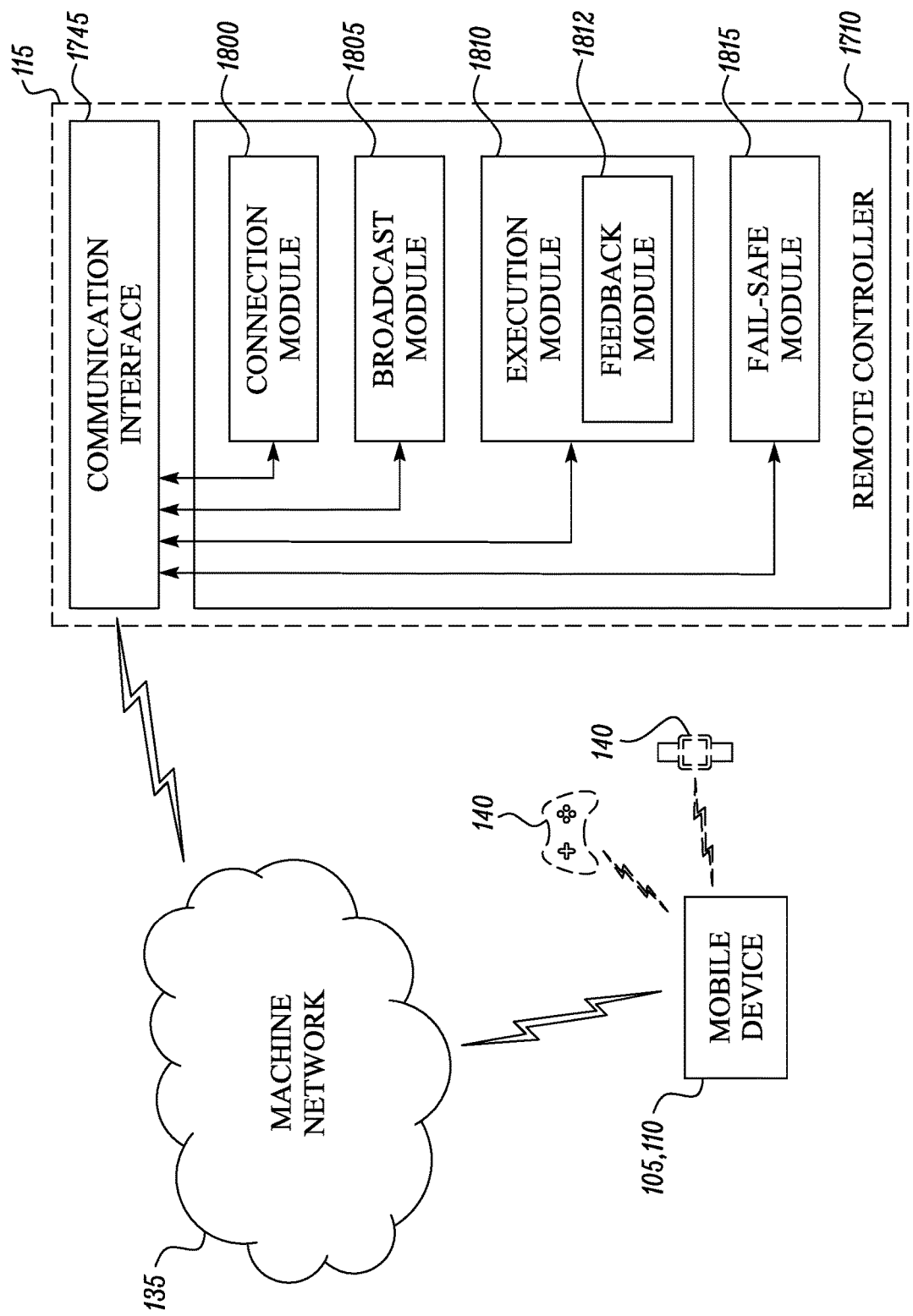
FIG. 18 is a schematic block diagram of a remote controller of the machine of FIG. 17, in accordance with the embodiment of the present disclosure.

Referring to FIGS. 17-18, the remote controller 1710 may include a connection module 1800 to validate mobile devices, for example, the mobile devices 105, 110 (see FIG. 1) requesting a wireless connection with the first machine 115. In some embodiments, the connection module 1800 may validate the mobile devices 105, 110 via comparison with the Personal-Identification-Number (PIN) or the pre-set password stored in the memory 1715. The connection module 1800 may then establish between the first machine 115 and the wireless connection with the mobile devices 105, 110 upon validation.

The remote controller 1710 may also include a broadcast module 1805 to broadcast the machine related information stored in the storage unit 1725 corresponding a request received from mobile devices such as, for example, the mobile devices 105, 110 of FIG. 1. The mobile devices 105, 110 may be wirelessly connected via the machine network 135 with the first machine 115 prior to receiving the request from the mobile devices 105, 110. In one embodiment, the broadcast module 1805 may broadcast the machine related information to one of the mobile devices 105, 110 at a given point in time. In another embodiment, broadcast module 1805 may broadcast the machine related information to both the mobile devices 105, 110 simultaneously upon receiving the request from the mobile devices 105, 110 respectively.

The remote controller 1710 may include an execution module 1810 to execute input commands received from the mobile devices 105, 110 respectively. In one embodiment, the execution module 1810 may execute the input commands received from one of the mobile devices 105, 110 at a given point in time. In another embodiment, the execution module 1810 may queue and execute the input commands received from the mobile devices 105, 110 based on a timestamp of the input commands received. The execution module 1810 may communicate with the machine gear circuit 1751, engine circuit 1752, the implement circuit 1753, and/or electronic circuity corresponding to the cab door 1754, the horn 1755, and/or the lights 1756 in order to execute the input commands. The execution module 1810 may also include a feedback module 1812 to broadcast feedback information including changes in the machine parameters 500 (see FIG. 5) detected via the sensors 1745 corresponding to the execution of the input commands by the remote controller 1710. In some embodiments, the execution module 1810 of the remote controller 1710 may communicate with the machine controller 1765 and/or the autonomous controller 1770 in order to execute the input commands received from the mobile devices 105, 110 via the machine network 135.

In some embodiments, the execution module 1810 may selectively ignore or pause execution of one or more input commands received from the mobile devices 105, 110 based on an operational mode of the first machine 115 such as, for example, forward or backward movement of the first machine 115. The execution module 1810 may communicate with the sensors 1745, circuits 1751-1756 and/or the machine controller 1765 to determine the operational mode of the first machine 115. The execution module 1810 may resume execution of the paused input commands once the operational mode is determined to be suitable for execution of the input commands by the execution module 1810.

The remote controller 1710 may include a fail-safe module 1815 to automatically shut down the first machine 115 or temporarily suspend execution of the input commands of the first machine 115 corresponding to one or more events. The events may correspond to, but not limited to, loss of wireless connectivity with the mobile devices 105, 110, detection of the predefined proximity with the mobile devices 105, 110 and/or the second machine 120 (also shown in FIG. 1), and/or the input commands received from the mobile devices 105, 110 to initiate the shutdown or the temporary suspension.

In some embodiments, the fail-safe module 1815 may also be configured to monitor a predefined safety sequence received from the first mobile device 105. For example, the fail-safe module 1815 may monitor a heartbeat sequence of the first operator 106 received from the first mobile device 105. The first mobile device 105 may receive the heartbeat sequence from the peripheral input device 140 that is worn by the first operator 106 and is connected to the first mobile device 105. In an embodiment, the fail-safe module 1815 may detect a change in the predefined sequence received from the first mobile device 105 and may subsequently turn-off the engine (not shown) of the first machine 115. The change detected in the predefined sequence may correspond to an irregularity or non-uniformity in the predefined sequence.

INDUSTRIAL APPLICABILITY

Figure 19:
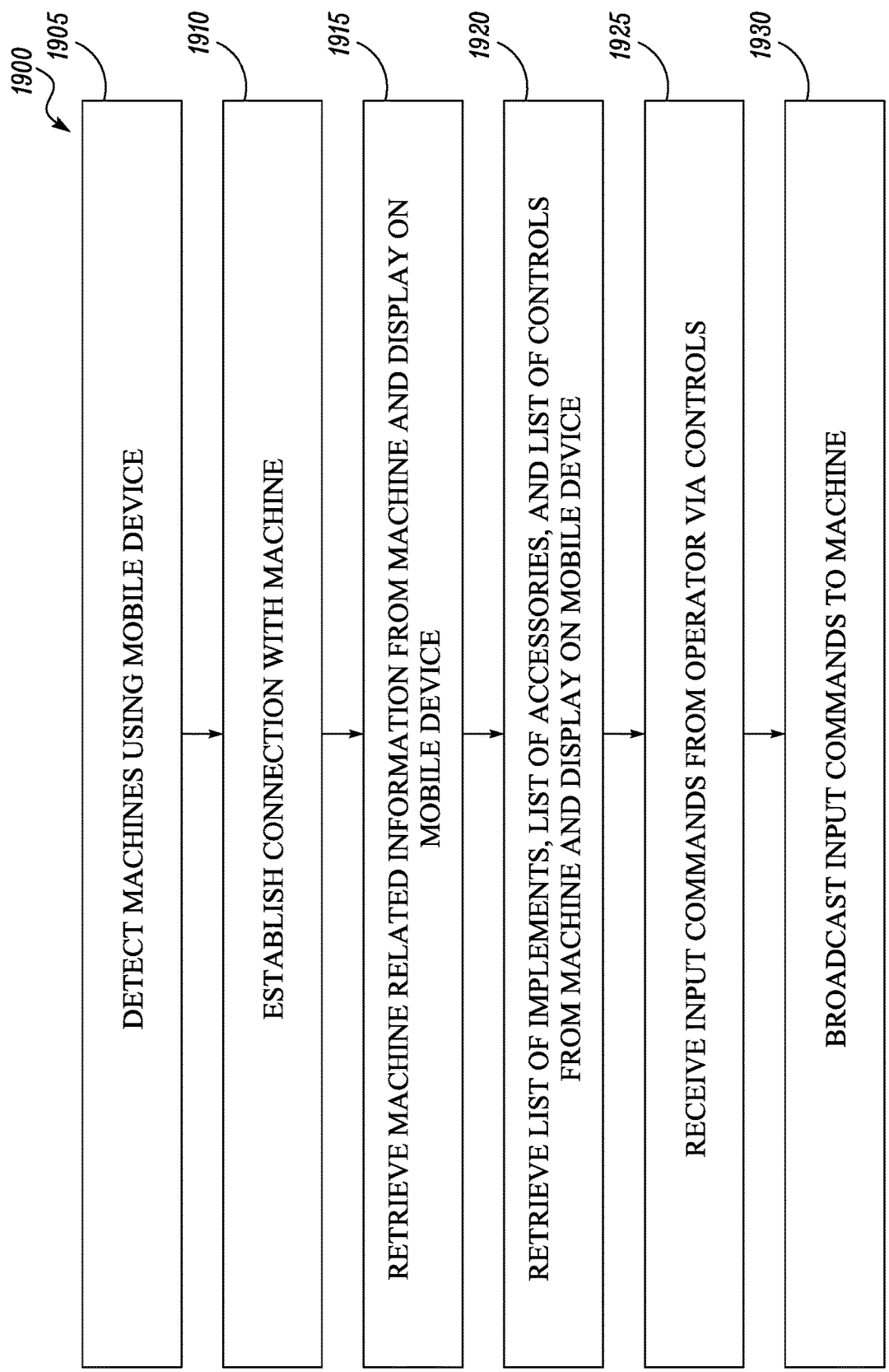
FIG. 19 is a schematic block diagram of a method for remote control of the machine of FIG. 17 using the mobile device of FIG. 2, in accordance with the embodiment of the present disclosure.

Referring to FIG. 19, a method 1900 for remote control of the machines 115, 120, 125, 130 using the mobile devices 105, 110, as shown in FIG. 1, is disclosed. The method 1900 includes a step 1905 of detecting the machines 115, 120, 125, 130 in a vicinity of an operator, for example, the first operator 106, using a mobile device such as, for example, the first mobile device 105. In an embodiment, the machines 115, 120, 125, 130 maybe is a line of sight of the first operator 106. The method 1900 also includes a step 1910 of establishing a wireless connection with a machine, for example, the first machines 115 via a machine network, for example, the machine network 135 of the first machine 115. The method 1900 also includes a step 1915 of retrieving machine related information from the first machine 115 upon establishing the wireless connection and displaying the machine related information on the first mobile device 105. The machine related information may include machine parameters such as, for example, the machine parameters 500 (see FIGS. 5-6). The method 1900 also includes a step 1920 of retrieving and displaying implements, for example, the implements 800 (see FIG. 8) and accessories, for example, the accessories 815 (see FIG. 8) of the first machine 115 on the first mobile device 105. In addition, the step 1920 includes retrieving and displaying controls, for example, the controls 906-909, 916-919, 921-922, 925 (see FIG. 9) corresponding to the first machine 115, an implement, for example, the first machine implement 801 (see FIG. 8), and the accessories 815 of the first machine 115 on the first mobile device 105. Further, the method 1900 also includes a step 1925 of receiving input commands from the first operator 106 corresponding to the controls 906-909, 916-919, 921-922, 925 of the first machine 115, the first machine implement 801, and/or the accessories 815. The method 1900 also includes a step 1930 of broadcasting the input commands to the first machine 115.

Figure 20:
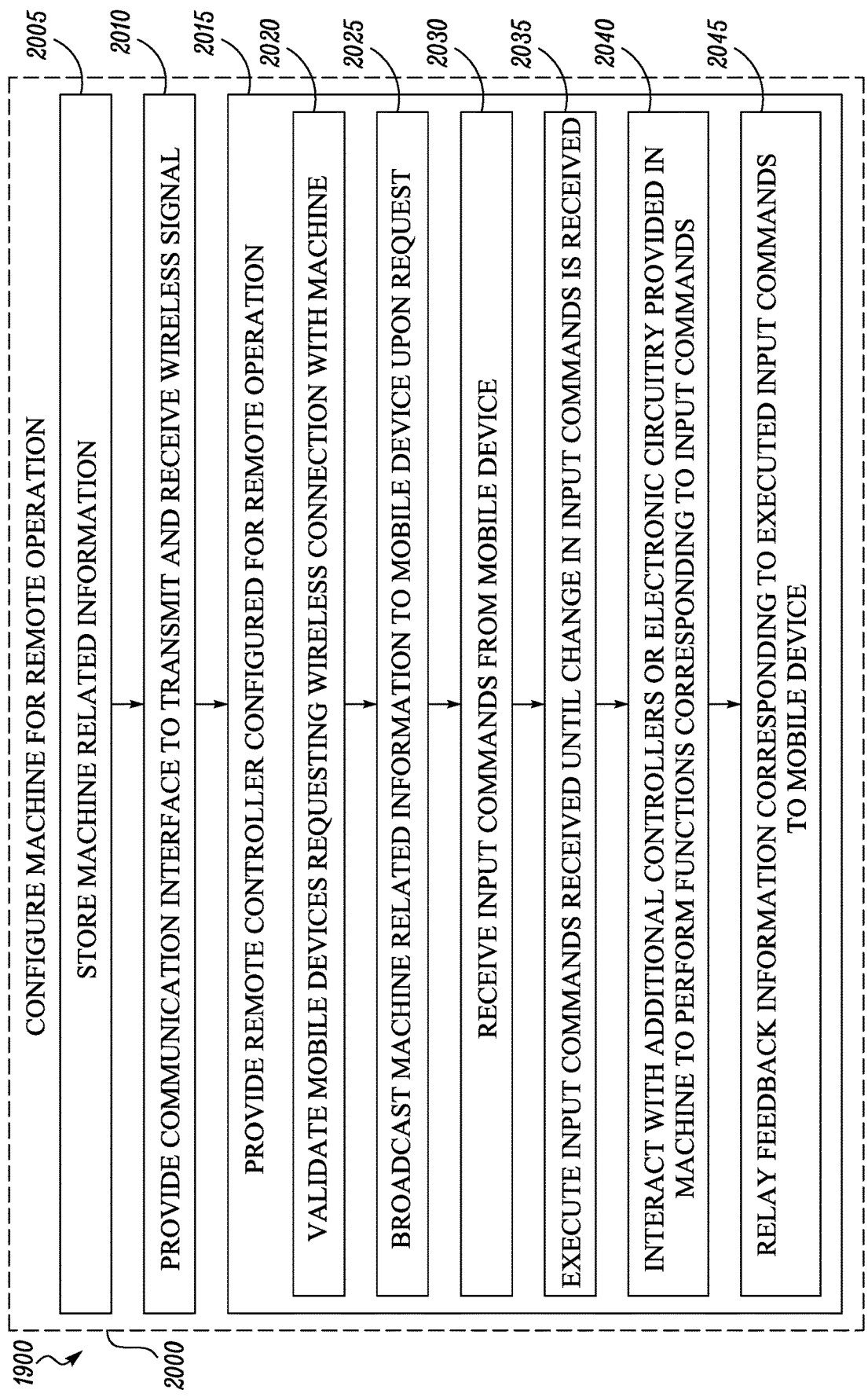
FIG. 20 is a schematic block diagram of the method of FIG. 19 including a step of configuring the machine of FIG. 17 to perform remote operations, in accordance with the embodiment of the present disclosure.

Referring to FIGS. 19-20, the method 1900 may also include a step 2000 of configuring the first machine 115 of FIG. 17 in order to perform the remote operations corresponding to the input commands received from a mobile device, for example, the first mobile device 105 of FIG. 2.

The step 2000 may include a step 2005 of storing machine related information in the first machine 115 in one or more electronic data formats. The step 2000 may also include a step 2010 of providing the communication interface 1740 to transmit and/or receive wireless signals. The step 2000 may also include a step 2015 of providing the remote controller 1710 that is configured to perform steps 2020-2045. The step 2020 includes validating the first mobile device 105 requesting a wireless connection with the first machine 115 via the machine network 135 (see FIG. 1) and establishing the wireless connection with the first mobile device 105 upon validation. The step 2025 includes broadcasting machine related information of the first machine 115 corresponding to a request from the first mobile device 105. The step 2030 includes receiving input commands from the first mobile device 105 via one or more controls, for example, the controls 906-909, 916-919, 921-922, 925 (see FIG. 9). The input commands may correspond to one or more computer instructions to be performed by the first machine 115 in order to perform one or more functions of the first machine 115, the first machine implement 801 (see FIG. 8) of the first machine 115, and/or the accessories 815 (see FIG. 8) of the first machine 115. Further, the step 2035 includes executing the input commands received from the first mobile device 105 until a change in the input commands is received from the first mobile device 105. The step 2040 includes interacting with additional controllers such as, for example, the machine controller 1765 and/or the autonomous controller 1770, to perform one or more functions corresponding to the input commands received. The step 2040 may also include interacting with electronic circuitry such as, for example, the implement circuit 1753 and the engine circuit 1752 to perform the functions corresponding to the input commands. The step 2045 includes relaying feedback information corresponding to the input commands being executed by the first machine 115. The feedback information may include changes in machine parameters such as, for example, the machine parameters 500 (see FIG. 5) of the first machine 115 corresponding to the input commands being executed.

Referring to FIGS. 19-20, it may be apparent that a mobile device, for example, the first mobile device 105 (see FIG. 1) may be used for remote control and operation of different types of machines, for example, the machines 115, 120, 125, 130 (see FIG. 1). Accordingly, the first mobile device 105 may replace multiple remote-control devices may be otherwise be required to control the machines 115, 120, 125, 130 independently. An operator, for example, the first operator 106 (see FIG. 1) may use a standalone application stored in the first mobile device 105 that provides an ergonomically designed GUI on the first mobile device 105 for the first operator 106 to connect to and remotely control the machines 115, 120, 125, 130. The first mobile device 105 may establish a wireless connection with the machines 115, 120, 125, 130 via a Wi-Fi Direct network and thereby, avoiding a need for additional hardware, such as an Infrared Blaster. The first mobile device 105 may also automatically retrieve and display the machine related information including the machine parameters, the implements, and the controls from the machines 115, 120, 125, 130 respectively via the standalone application. In an embodiment, the controls displayed may be similar to controls provided for manual operation in the machines 115, 120, 125, 130 respectively and thereby, assist the first operator 106 in identification, familiarisation, and operation of the machines 115, 120, 125, 130. The first operator 106 may also monitor and track the different machine parameters, for example, the machine parameters 500 (see FIG. 5-6) via the standalone application. Further, the first mobile device 105 may also detect, display, and/or visually represent additional tools, accessories, retrofitted tools, and/or modifications to existing implements in the machines 115, 120, 125, 130. Further, the first mobile device 105 may also provide additional safety features to the first operator 106 such as, for example, automatic shutdown of the machines 115, 120, 125, 130 when the first mobile device 105 is not functional or inoperable and/or for instances when the machines 115, 120, 125, 130 are within a predefined proximity range of the first mobile device 105. In addition, the first mobile device 105 may also be paired with or connected to peripheral input devices such as, for example, the peripheral input device 140 for remote control and operation of the machines 115, 120, 125, 130. The first mobile device 105 also enables the first operator 106 to avoid manual operation of the machines 115, 120, 125, 130 in hazardous environments.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A method for remote operation of one or more machines using a mobile device, comprising:
   detecting the one or more machines using the mobile device via a wireless network, wherein the one or more machines detected are displayed on a graphical user interface (GUI) of the mobile device;
   establishing a wireless connection with at least one machine of the one or more machines detected using the mobile device;
   retrieving machine related information from the at least one machine via the mobile device upon the establishment of the wireless connection, wherein the machine related information includes one or more machine parameters, one or more implements, and one or more controls of the at least one machine;
   displaying the machine related information including the one or more machine parameters, the one or more implements, and the one or more controls respectively on the GUI of the mobile device;
   receiving at least one input command from an operator of the mobile device;
   broadcasting the at least one input command received from the operator to the at least one machine, wherein the at least one input command includes computer instructions to be executed by the at least one machine to perform one or more functions corresponding to at least one control of the one or more controls; and
   disabling the one or more controls on the GUI based on a Boolean state of the one or more machine parameters, the Boolean state being included in the machine related information.

2. The method of claim 1, wherein the detecting includes detecting the wireless network broadcasted by the one or more machines respectively, the one or more machines including earth-moving machines, loading and dumping machines, and material transportation machines.

3. The method of claim 1, including:
   reserving the at least one machine for the remote operation using the mobile device after the establishment of the wireless connection, wherein the at least one input command is received from the operator and broadcasted to the at least one machine upon the reservation of the at least one machine.

4. The method of claim 1, wherein the retrieving the machine related information includes one of:
   transmitting a request to the at least one machine via the mobile device and receiving the machine related information corresponding to the request; or
   automatically retrieving the machine related information from the at least one machine upon the establishment of the wireless connection.

5. The method of claim 1, wherein the one or more machine parameters, the one or more implements, and the one or more controls are displayed as at least one of, a text, symbols, icons, images, animations, or a video, that are included in the retrieved machine related information or stored in the mobile device.

6. The method of claim 1, including:
   monitoring and tracking one or more changes to the machine related information transmitted from the at least one machine; and
   modifying the display of the one or more machine parameters, the one or more implements, and the one or more controls respectively on the GUI corresponding to the one or more changes detected, wherein the modification includes changing a color, a text, symbols, icons, images, animations, a video, and a live video of the machine related information displayed.

7. The method of claim 1, including:
   providing a haptic feedback to the operator corresponding to the at least one input command received, wherein the at least one input command is received via at least one of audio inputs, gesture movements, touch screen inputs, cursor inputs, joystick inputs, wearable device inputs, or gamepad inputs detected by the mobile device.

8. The method of claim 1, including configuring the one or more machines for the remote operation, the configuring including:
   storing machine related information in the one or more machines respectively in one or more electronic data formats respectively, wherein the machine related information includes one or more machine parameters, one or more implements, and one or more controls of the one or more machines;
   providing a communication interface in the one or more machines respectively for transmitting and receiving a wireless signal; and
   providing a remote controller in the one or more machines respectively that is configured to:
      validate and establish a wireless connection with the mobile device via the wireless signal,
      broadcast the stored machine related information to the mobile device via the communication interface upon the establishment of the wireless connection, and
      receive and execute the at least one input command transmitted from the mobile device in order to perform the one or more functions corresponding to the at least one control.

9. The method of claim 8, wherein the remote controller is configured to:
   interact with one or more additional controllers and one or more electronic circuitry provided in the one or more machines respectively in order to perform the one or more functions; and
   relay feedback information corresponding to the one or more functions being performed to the mobile device, the feedback information including a change in the machine related information.

10. A mobile computing device for remote operation of one or more machines, comprising:
   a communication interface that is capable of transmitting and receiving a wireless signal;
   a memory to store one or more computer instructions; and
   a processor to execute the one or more computer instructions stored in the memory, the processor including:
      a machine detection module to detect and display the one or more machines on a graphical user interface (GUI) of the mobile computing device via a wireless network, the list including an identity of the one or more machines,
      a connection module to establish a wireless connection with at least one machine of the one or more machines,
      a machine control module to retrieve machine related information from the at least one machine on the GUI upon the establishment of the wireless connection, wherein the machine related information includes one or more machine parameters, one or more implements, and one or more controls of the at least one machine,
      an implement module to display the one or more implements and the one or more controls on the GUI,
      a command module to receive at least one input command from an operator and transmit the at least one input command to the at least one machine, wherein the at least one input command includes computer instructions to be executed by the at least one machine to perform one or more functions corresponding to at least one control of the one or more controls, and
      a safety module to disable the one or more controls on the GUI based on a Boolean state of the one or more machine parameters, the Boolean state being included in the machine related information.

11. The mobile computing device of claim 10, wherein the machine control module displays the one or more machine parameters on the GUI and monitors, detects, and tracks changes in the one or more machine parameters transmitted by the at least one machine.

12. The mobile computing device of claim 10, wherein:
   the one or more machine parameters include a speed of the at least one machine and an engine speed of the at least one machine,
   the one or more controls include implement manoeuvres, machine manoeuvres, engine controls, machine controls, and accessory controls of the at least one machine, and
   the one or more machine parameters, the one or more implements, and the one or more controls are displayed as at least one of a text, symbols, icons, images, animations, or a video that is included in the retrieved machine related information or stored in the mobile device.

13. The mobile computing device of claim 10, wherein the implement module:
   displays one or more accessories of the at least one machine on the GUI; and
   displays one or more controls of the one or more accessories respectively on the GUI, wherein the one or more accessories and the one or more controls of the one or more accessories respectively are included in the machine related information.

14. The mobile computing device of claim 10, wherein the command module includes a haptic feedback module to provide a haptic feedback corresponding to the at least one input command received from the operator.

15. The mobile computing device of claim 10, wherein the safety module is further configured to:
relay a deactivation command to the at least one machine to stop the execution of the at least one input command when the mobile computing device is at least one of unresponsive, idle, or inoperable;
relay a shut-down command to the at least one machine to switch off an engine of the at least one machine when the at least one machine is detected to be at a predefined proximity from the mobile computing device;
receive the shut-down command from a peripheral input device that is connected to and in communication with the mobile computing device to switch off the engine of the at least one machine when the mobile computing device is at least one of unresponsive, idle, or inoperable, the peripheral input device including a joystick, a gamepad, or a wearable device; and
monitor a predefined safety sequence via the peripheral input device and relay the predefined safety sequence to the at least one machine.

16. The mobile computing device of claim 10, wherein the command module is configured to:
receive the at least one input command from a peripheral input device that is connected to and in communication with the mobile computing device, the peripheral input device including a joystick, a gamepad, or a wearable device; and
transmit the at least one input command received from the peripheral input device to the at least one machine.

17. The mobile computing device of claim 10, wherein the command module is configured to:
provide one or more command joysticks on the GUI that are configured to be positioned at one or more control locations on the GUI by the operator, the one or more control locations corresponding to the one or more controls or a combination of the one or more controls displayed;
ascertain a percentage of power to be applied by the at least one machine corresponding to the one or more controls or the combination of the one or more controls based on the position of the one or more command joysticks at the control locations on the GUI, wherein the percentage of power is proportional to the position and a proximity of the one or more command joysticks with respect to the one or more controls displayed respectively; and
assign the percentage of power to be applied in the at least one input command to be transmitted to the at least one machine.

18. A machine, comprising:
a communication interface that is capable of transmitting and receiving a wireless signal;
one or more implements configured to perform one or more functions respectively; and
a remote controller to execute one or more computer instructions, the remote controller including:
a memory to store the one or more computer instructions,
a connection module to validate one or more mobile devices requesting a wireless connection with the machine via the wireless signal and establish the wireless connection with at least one mobile device of the one or more mobile devices upon validation,
a broadcast module to broadcast machine related information stored in the machine in one or more electronic data formats to the at least one mobile device via the communication interface upon the establishment of the wireless connection, wherein the machine related information includes one or more machine parameters, one or more implements, one or more controls of the machine, and a Boolean state of the one or more machine parameters associated with disabling one or more controls on a graphical user interface (GUI) of the at least one mobile device, and
an execution module to execute at least one input command received from the at least one mobile device via the communication interface, the at least one input command including the one or more computer instructions to be executed by the remote controller in order to perform at least one of one or more functions of the machine.

19. The machine of claim 18, wherein the execution module includes:
a feedback module to relay feedback information via the communication interface corresponding to the execution of the at least one input command, the feedback information including changes in the one or more machine parameters, the one or more machine parameters including a speed of the machine and an engine speed corresponding to the at least one input command.

20. The machine of claim 18, including:
a fail-safe module configured to:
stop execution of the at least one input command upon loss of the wireless connection with the at least one mobile device automatically;
monitor a predefined safety sequence received from the at least one mobile device, the predefined safety sequence being provided by a peripheral input device connected to the at least one mobile device; and
switch off an engine of the at least one machine when the predefined safety sequence is determined to be non-uniform.

* * * * *